United States Patent
Kose Cihangir et al.

(10) Patent No.: US 12,315,302 B2
(45) Date of Patent: May 27, 2025

(54) METHODS AND DEVICES FOR AN OCCUPANT OF A VEHICLE

(71) Applicant: Intel Corporation, Santa Clara, CA (US)

(72) Inventors: Neslihan Kose Cihangir, Munich (DE); Nese Alyuz Civitci, Portland, OR (US); Rafael Rosales, Unterhaching (DE); Ignacio J. Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 317 days.

(21) Appl. No.: 17/465,885

(22) Filed: Sep. 3, 2021

(65) Prior Publication Data

US 2021/0397863 A1 Dec. 23, 2021

(51) Int. Cl.
| | |
|---|---|
| *G06V 40/40* | (2022.01) |
| *B60R 25/31* | (2013.01) |
| *G06F 21/32* | (2013.01) |
| *G06V 20/59* | (2022.01) |
| *G06V 40/16* | (2022.01) |
| *G06V 40/20* | (2022.01) |
| *G06V 40/70* | (2022.01) |

(52) U.S. Cl.
CPC .............. *G06V 40/40* (2022.01); *B60R 25/31* (2013.01); *G06F 21/32* (2013.01); *G06V 20/597* (2022.01); *G06V 40/171* (2022.01); *G06V 40/172* (2022.01); *G06V 40/28* (2022.01); *G06V 40/70* (2022.01)

(58) Field of Classification Search
CPC .... G06V 40/40; G06V 40/171; G06V 40/172; G06V 40/28; G06V 40/70; G06V 20/597; G06V 20/59; B60R 25/31; G06F 21/32
See application file for complete search history.

(56) References Cited

U.S. PATENT DOCUMENTS

| | | | | |
|---|---|---|---|---|
| 2021/0105619 | A1* | 4/2021 | Kashani | ................. G06F 21/32 |
| 2021/0397817 | A1* | 12/2021 | Su | .......................... H04N 23/11 |
| 2022/0156959 | A1* | 5/2022 | Sakurai | .................. G06V 40/45 |

(Continued)

OTHER PUBLICATIONS

Galbally, Javier, Sebastien Marcel, and Julian Fierrez. "Biometric antispoofing methods: A survey in face recognition." IEEE Access 2 (2014): 1530-1552. (Year: 2014).*

(Continued)

*Primary Examiner* — Wassim Mahrouka
(74) *Attorney, Agent, or Firm* — Viering, Jentschura & Partner mbB

(57) ABSTRACT

Devices and methods for an occupant of a vehicle are provided in this disclosure. A device for identifying an occupant of a vehicle may include a processor. The processor may be configured to determine an identity for the occupant based on a first sensor data including information indicating a detection of a facial attribute of the occupant. The processor may further be configured to estimate a behavior for the occupant based on a second sensor data including information indicating a detection of a body attribute of the occupant. The processor may further be configured to determine a spoofing attempt result indicating whether the occupant attempts a spoofing based on the determined identity and the estimated behavior.

25 Claims, 13 Drawing Sheets

(56) References Cited

U.S. PATENT DOCUMENTS

| | | | | |
|---|---|---|---|---|
| 2023/0008297 A1* | 1/2023 | Lyu | ...................... | G06V 40/168 |
| 2023/0177886 A1* | 6/2023 | Urabe | .................... | A61B 5/015 |
| | | | | 382/116 |

OTHER PUBLICATIONS

Liljestrand, Simon, "Anti-Spoofing for Facial Recognition based Identification System Using Convolutional Neural Networks to Detect Fake Faces", Masterthesis, Published 2020, 59 pages, Chalmers University of Technology.

Kose, Neslihan et al., "Mask spoofing in face recognition and countermeasures", Image and Vision Computing, Published 2014, 11 pages, Elsevier.

Kose, Neslihan et al., "Real-Time Driver State Monitoring Using a CNN Based Spatio-Temporal Approach", Jul. 18, 2019, 7 pages, arXiv.

Ortega, J. D. et al., "Dmd: A large-scale multi-modal driver monitoring dataset for attention and alertness analysis", ECCV Workshop 2020, Aug. 27, 2020, 18 pages, arXiv.

Fridman, Lex et al., "MIT Advanced Vehicle Technology Study: Large-Scale Naturalistic Driving Study of Driver Behavior and Interaction with Automation", Aug. 14, 2019, 16 pages, arXiv.

Idemia, "Biometric Devices & Automotive", https://www.idemia.com/market/biometric-devices-automotive, Retrieved on Sep. 2, 2021; 4 pages; IDEMIA.

Dang, Anh; "Facial Recognition: Types of Attacks and Anti-Spoofing Techniques Dissolving the myth of easy-to-fake face recognition"; https://towardsdatascience.com/facial-recognition-types-of-attacks-and-anti-spoofingtechniques-9d732080f91e; Retrieved on Aug. 24, 2021; 7 pages; towards data science.

Hadid, Abdenour, "Face Biometrics under Spoofing Attacks: Vulnerabilities, Countermeasures, Open Issues, and Research Directions", CVPR Workshop 2014, Published 2014, 6 pages, Computer Vision Foundation.

Ming, Zuheng et al., "A Survey on Anti-Spoofing Methods for Facial Recognition with RGB Cameras of Generic Consumer Devices", Oct. 8, 2020, 53 pages, arXiv.

Erdogmus, Nesli et al., "Spoofing Face Recognition With 3D Masks", IEEE Transactions On Information Forensics and Security, Published Jul. 2014, 14 pages, vol. 9, No. 7, IEEE.

Pan, Gang et al., "Eyeblink-based Anti-Spoofing in Face Recognition from a Generic Webcamera", International Conference on Computer Vision, Oct. 14-21, 2007, 8 pages, IEEE.

Li, Jiangwei et al., "Live face detection based on the analysis of Fourier spectra" Biometric Technology for Human Identification, Aug. 25, 2004, 9 pages, vol. 5404, SPIE.

Bao, Wei et al., "A Liveness Detection Method for Face Recognition Based on Optical Flow Field", Published 2009, 4 pages, IEEE.

Li, Xiaobai et al., "Generalized face anti-spoofing by detecting pulse from face videos" 23rd International Conference on Pattern Recognition (ICPR), Cancún, México, Dec. 4-8, 2016, 6 pages, IEEE.

Määttä, Jukka, et al., "Face spoofing detection from single images using texture and local shape analysis", IET biometrics, Published Feb. 9, 2012, 8 pages, vol. 1, Issue 1, The Institution of Engineering and Technology.

Komulainen, Jukka et al. "Context based Face Anti-Spoofing" Retrieved on Aug. 27, 2021, 8 pages, IEEE.

Patel, Keyurkumar et al., "Cross-Database Face Antispoofing with Robust Feature Representation", Chinese Conference on Biometric Recognition (CCBR), 2016, 9 pages, Springer.

Li, Lei et al., "An Original Face Anti-spoofing Approach using Partial Convolutional Neural Network", Published 2016, 6 pages, IEEE.

De Freitas Pereira, Tiago et al., "Can Face Anti-spoofing Countermeasures Work in a RealWorld Scenario?" Published 2013, 8 pages, IEEE.

Xu, Zhengi et al., "Learning Temporal Features Using LSTM-CNN Architecture for Face Anti-spoofing" 3rd IAPR Asian Conference on Pattern Recognition (ACPR), 2015, 5 pages, IEEE.

Yang, Xiao et al., "Face Anti-Spoofing: Model Matters, So Does Data", IEEE Conference on Computer Vision and Pattern Recognition, 2019, 10 pages, Computer Vision Foundation.

Wang, Tao et al. "Face Liveness Detection Using 3D Structure Recovered from a Single Camera", Retrieved Aug. 27, 2021, 6 pages, IEEE.

Wang, Zezheng et al., "Exploiting temporal and depth information for multi-frame face anti-spoofing", Mar. 5, 2019, 15 pages, arXiv.

Pan, Gang et al., "Monocular camera-based face liveness detection by combining eyeblink and scene context", Telecommunication Systems, Published Aug. 4, 2010, 11 pages, Springer.

Atoum, Yousef et al., "Face Anti-Spoofing Using Patch and Depth-Based CNNs", 2017 IEEE International Joint Conference on Biometrics (IJCB), Oct. 1-4, 2017, 10 pages, IEEE.

Liu, Yaojie et al., "Deep tree learning for zero-shot face anti-spoofing", Apr. 9, 2019, 10 pages, arXiv.

Shao, Rui et al., "Multi-adversarial Discriminative Deep Domain Generalization for Face Presentation Attack Detection", Retrieved on Aug. 27, 2021, 9 pages, Computer Vision Foundation.

Plesh, Richard et al. "Fingerprint Presentation Attack Detection utilizing Time-Series, Color Fingerprint Captures", Apr. 8, 2021, 8 pages, arXiv.

Joshi, Mahesh et al., "Security Vulnerabilities Against Fingerprint Biometric System", May 18, 2018, 27 pages, arXiv.

Bose, Raja; "How to implement fingerprint authentication in automobiles" https://www.electronicproducts.com/how-to-implement-fingerprint-authentication-in-automobiles/; Retrieved on Aug. 27, 2021; 7 pages; Electronic Products.

Galbally, Javier et al., "A high performance fingerprint liveness detection method based on quality related features", Elsevier Future Generation Computer Systems Journal, Published 2010, 13 pages, Elsevier.

Köpüklü, Okan et al., "DriverMHG: A Multi -Modal Dataset for Dynamic Recognition of Driver Micro Hand Gestures and a Real-Time Recognition Framework", 15th IEEE International Conference on Automatic Face and Gesture Recognition (FG 2020), Published 2020, 8 pages, IEEE.

Habib, A. et al., "Robust anti-spoofing techniques for fingerprint liveness detection: A Survey", 2021 IOP Conference Series: Materials Science and Engineering, Published 2021, 17 pages, vol. 1033, IOP Publishing Ltd.

Tan, Xiaoyang et al., "Face Liveness Detection from a Single Image with Sparse Low Rank Bilinear Discriminative Model", Published 2010, 14 pages, Springer.

Mishra, Preeti et al., "A Detailed Investigation and Analysis of Using Machine Learning Techniques for Intrusion Detection", IEEE Communications Surveys & Tutorials, Published 2018, 43 pages, vol. 21, No. 1, IEEE.

Yuan, Chengsheng et al., "Fingerprint Liveness Detection Using an Improved CNN With Image Scale Equalization", IEEE Access, Mar. 12, 2019, 14 pages, vol. 7, IEEE.

Nogueira, Rodrigo Frassetto et al., "Fingerprint Liveness Detection Using Convolutional Neural Networks", IEEE Transactions On Information Forensics and Security, Published Jun. 2016, vol. 11, No. 6, IEEE.

Shenfield, Alex et al., "Intelligent intrusion detection systems using artificial neural networks", ICT Express, Published May 1, 2018, 5 pages, vol. 4, No. 2, Elsevier.

Xia, Zhihua et al., "A Novel Weber Local Binary Descriptor for Fingerprint Liveness Detection", IEEE Transactions On Systems, Man, and Cybernetics: Systems, Published Apr. 2020, 11 pages, vol. 50, No. 4, IEEE.

Dubey, Rohi Kumar et al., "Fingerprint Liveness Detection From Single Image Using Low-Level Features and Shape Analysis", IEEE Transactions On Information Forensics and Security, Published Jul. 2016, 15 pages, vol. 11, No. 7, IEEE.

Barry, Keith; "CR Engineers Show a Tesla Will Drive With No One in the Driver's Seat"; https://www.consumerreports.org/autonomous-

(56) References Cited

OTHER PUBLICATIONS driving/cr-engineers-show-tesla-will-drive-with-noone-in-drivers-seat/; Retrieved on Aug. 27, 2021; 15 pages; Consumer Reports, Inc.

\* cited by examiner

METHODS AND DEVICES FOR AN OCCUPANT OF A VEHICLE

TECHNICAL FIELD

This disclosure generally relates to methods and devices for an occupant of a vehicle.

BACKGROUND

Driver monitoring systems have been used for various vehicles to monitor the driver of the vehicle, e.g. in order to assess the alertness of the driver or to assess a risk level for the driver according to the behavior of the driver while driving. With recent advancements with respect to semi-autonomous/autonomous driving, a portion of the functions performed by the driver while driving is transferred to the vehicle itself based on the level of the autonomous driving, however, the driver may still be expected to pay attention to the traffic environment. Furthermore, occupant monitoring systems have been employed to monitor not only the driver but also other occupants in a vehicle using various sensors. The sensors may be located in the interior of the vehicle and they may be configured to monitor the occupants. Such occupant monitoring systems may provide various information related to the occupants of the vehicle.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
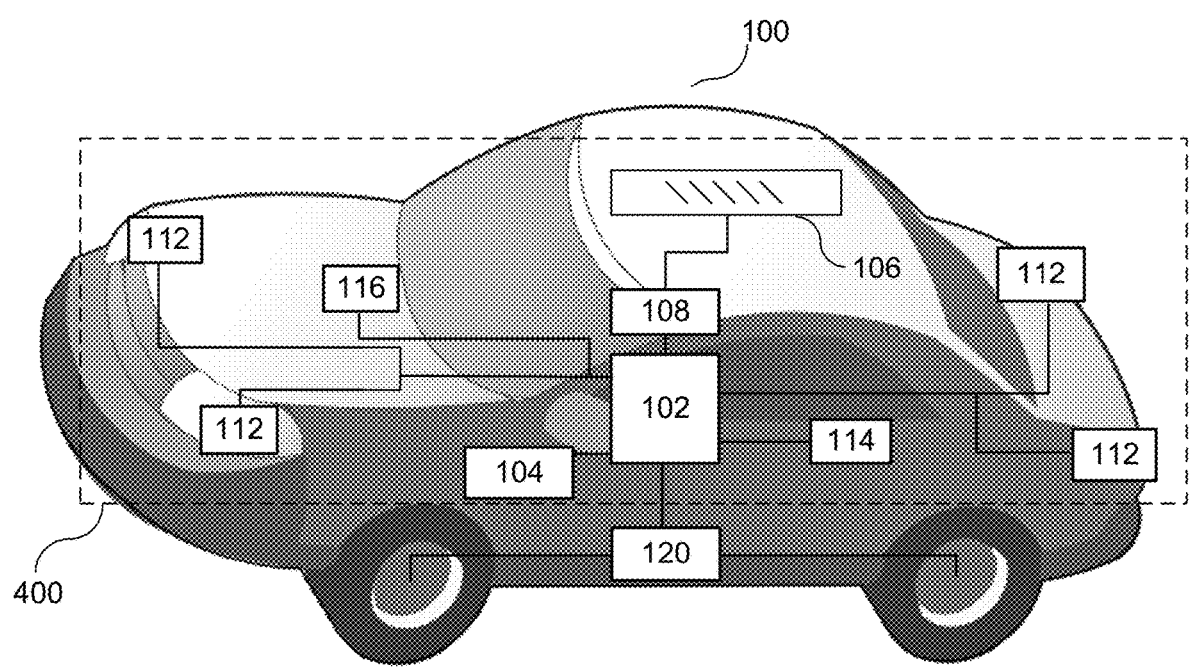
FIG. 1 shows a vehicle including a mobility system and a control system.

The following detailed description refers to the accompanying drawings that show, by way of illustration, exemplary details and aspects in which aspects of the present disclosure may be practiced.

With recent developments in vehicle and road related technologies, the vehicles are being employed with various interior sensors in order to detect various attributes of occupants of the vehicles using sensor data received from the various interior sensors. The detected attributes may be used to support various functions with respect to semi-autonomous/autonomous driving. Identification of the occupants of the vehicle may also be used for various reasons. For example, the vehicle may be configured to identify at least one of the occupants of the vehicle to run, in order to prevent possible risks of theft. Another example may be that the vehicle may not authorize an occupant to take over a driving function, if the occupant is not allowed to drive (e.g. a minor). The identification functions may also be used to identify the occupant and adjust certain settings related to the vehicle that are previously assigned for the identified occupant (e.g. seat settings, temperature settings, driving mode, etc.).

An identification function may be prone to a spoofing attack. The spoofing attack may be considered as a situation with respect to the vehicles that an occupant performing an action to be identified as another occupant by the vehicle. For example, if the vehicle performs the identification via a camera, either through image detection or video detection, an occupant may show an image or a video of another person to the camera in order to be identified as another person. In another example, an occupant may wear a three-dimensional mask that was created according to the facial attributes of another person. It may be desirable to decrease the chance of success for spoofing attacks.

Spoofing attempts may not happen only before the drive while identifying the driver/occupant but also during driving as well. For example, in level 3 autonomous driving, an occupant may attempt to get control of the vehicle during driving by reaching over to the steering wheel. Hence, continuous authentication is desirable to allow the supervisory role is to be carried out accurately for key events such as takeovers. In level 4/level 5 autonomous driving, a minor or a person who is not allowed to drive may also attempt to access the settings of a person allowed to drive by requesting authentication and gaining access to a driving function of the vehicle like routing or inappropriate media content. Hence, it is desirable to monitor spoofing attempts during driving. People who are not allowed to drive the vehicle may attempt spoofing by using a facial print, video, or 3D mask of a person who may be identified for spoofing purposes Extreme makeup and plastic surgery are also other types of spoofing attacks.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains fewer elements than the set.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

As used herein, "occupant" is understood as a person who is in a vehicle. An occupant may be a person who is responsible to provide at least one operating function to the vehicle, (e.g. a driver, an operator), or may be a person who is in the vehicle without providing any operating functions to the vehicle (e.g. a passenger).

As used herein, "attribute" is understood as a quality, feature, or characteristic that may be deemed to be ascribed to someone. For example, an attribute of an occupant may include a facial attribute, and/or a finger attribute (e.g. fingerprint), and/or a body attribute (e.g. height, weight, thickness, etc.) specific to at least a portion of a body of the occupant, a movement attribute (e.g. hand gesture, body gesture, body posture, etc.), a behavior attribute (e.g. actions, reactions, etc.), a position attribute (e.g. location) specific to at least a portion of a body of the occupant, and such.

As used herein, "interaction" is understood as a mutual or reciprocal action or influence between entities. For example, an interaction of an occupant with a vehicle may include any type of action that may cause an effect on a component of the vehicle or attached to and/or in relation to the vehicle.

The term "body" used in this disclosure, has been used in a manner that it may refer only to a portion of a body. For example, a body gesture may include a gesture of a person which is made only using hands, arms, legs, fingers, etc.

The disclosure may include information related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section).

Figure 2:
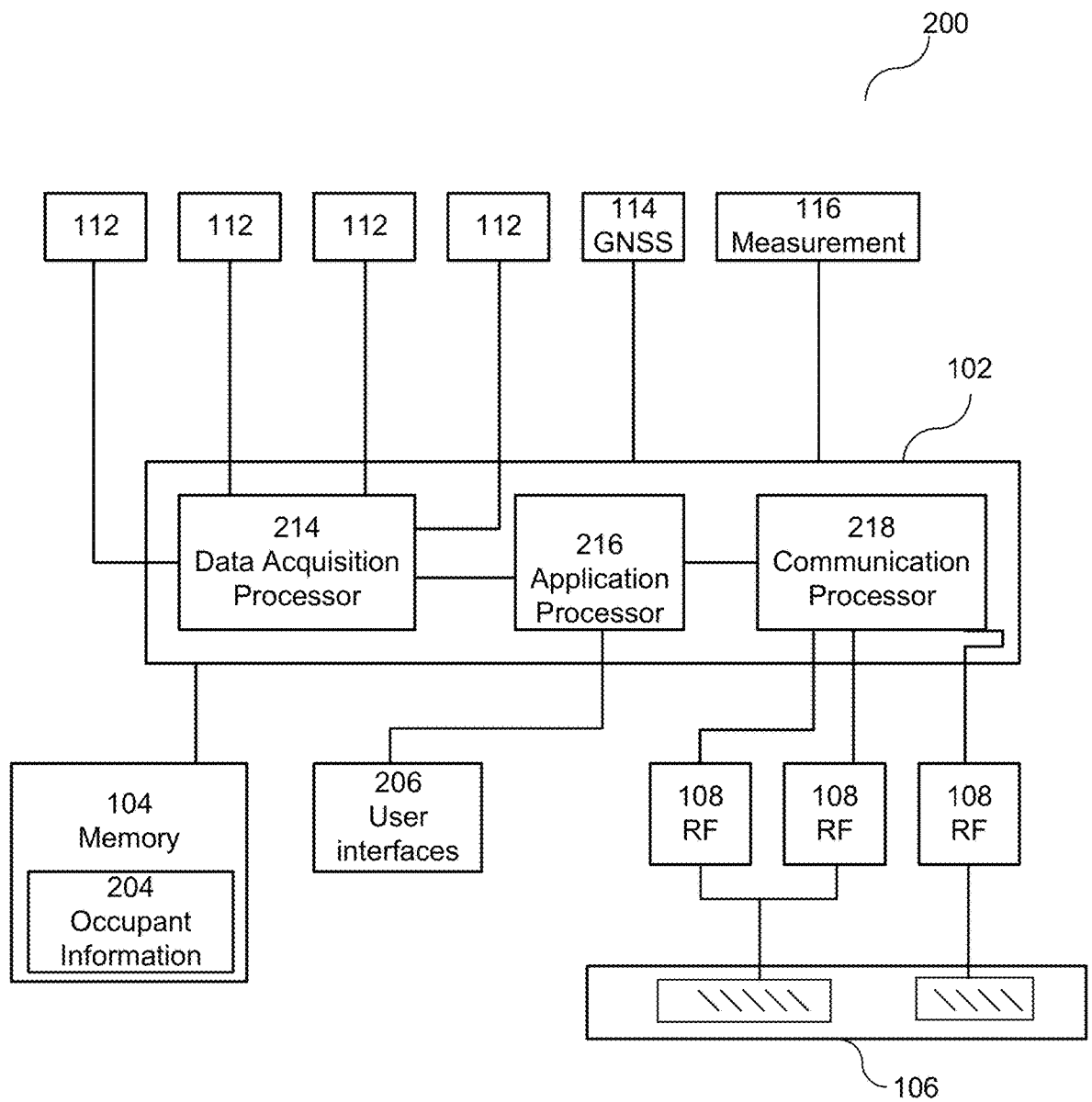
FIG. 2 shows schematically a vehicle including a mobility system and a control system.

FIG. 1 shows a vehicle 100 including a mobility system 120 and a control system 200 (see also FIG. 2). It is appreciated that vehicle 100 and control system 200 are exemplary in nature and may thus be simplified for explanatory purposes. For example, while vehicle 100 is depicted as a ground vehicle, this may be equally or analogously applied to aerial vehicles, water vehicles (e.g. sea vehicles, underwater vehicles), and such. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels.

In addition to including a control system 200, vehicle 100 may also include a mobility system 120. Mobility system 120 may include components of vehicle 100 related to steering and movement of vehicle 100. Where vehicle 100 is an automobile, for example, mobility system 120 may include wheels and axles, a suspension, an engine, a transmission, brakes, a steering wheel, associated electrical circuitry and wiring, and any other components used in the driving of an automobile.

Mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components, such as a traffic infrastructure system, or a roadside unit, or a monitoring system.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a CPU, support circuits, digital signal processors, integrated circuits, memory, or any other types of devices suitable for running applications and for image processing and analysis. Each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 214 may include processing circuitry, such as a CPU, for processing data acquired by data acquisition units 112. For example, if one or more data acquisition units are image acquisition units including sensors e.g. one or more cameras, then the data acquisition processor may include image processors for processing image data using the information obtained from the image acquisition units as an input. The data acquisition processor 214 may therefore be configured to create voxel maps detailing the surrounding of the vehicle 100 based on the data input from the data acquisition units 112, i.e., cameras in this example. For example, the one or more data acquisition units may include sensors, and the data acquisition processor 214 may receive information from the sensors and provide sensor data to the application processor. The sensor data may include information indicating the detections performed by the sensors.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. Application processor 216 may interface with the data acquisition processor 214 to receive sensor data.

In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver 108. RF transceiver 108 may then process the digital baseband samples to convert the digital baseband samples to analog RF signals, which RF transceiver 108 may wirelessly transmit via antenna system 106.

In the receive path, RF transceiver 108 may receive analog RF signals from antenna system 106 and process the analog RF signals to obtain digital baseband samples. RF transceiver 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via a user interface 206. User interfaces 206 may include one or more screens, microphones, mice, touchpads, keyboards, or any other interface providing a mechanism for user input.

Vehicle 100 may transmit and receive wireless signals with antenna system 106, which may be a single antenna or an antenna array that includes multiple antenna elements. Antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. Communication processor 218 may control the radio transmission and reception of RF transceiver(s) 108, including specifying the transmit and receive radio frequencies for operation of RF transceiver (s) 108.

Communication processor 218 may include a baseband modem configured to perform physical layer (PHY, Layer 1) transmission and reception processing to, in the transmit path, prepare outgoing transmit data provided by communication processor 218 for transmission via RF transceiver (s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding, and interleaving, channel modulation/demodulation, physical channel mapping, radio measurement and search, frequency and time synchronization, antenna diversity processing, power control, and weighting, rate matching/de-matching, retransmission processing, interference cancelation, and any other physical layer processing functions.

RF transceiver(s) 108 may include separate RF circuitry sections dedicated to different respective radio communication technologies, and/or RF circuitry sections shared between multiple radio communication technologies. Antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Memory 214 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. Each of the one or more antennas of antenna system 106 may be placed at a plurality of locations on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies.

While shown as a single element in FIG. 1, antenna system 106 may include a plurality of antenna elements (e.g., multiple antenna arrays) positioned at different locations on vehicle 100. The placement of the plurality of antenna elements may be strategically chosen in order to ensure a desired degree of RF coverage. For example, additional antennas may be placed at the front, back, corner (s), and/or on the side(s) of the vehicle 100.

Data acquisition devices 112 may include any number of data acquisition devices and components, including sensors, depending on the requirements of a particular application. This may include image acquisition devices, proximity detectors, acoustic sensors, pressure sensors, fingerprint sensors, motion detectors, etc., for providing data about the interior of the vehicle or the vehicle's environment. Image acquisition devices may include cameras (e.g., multimodal cameras, standard cameras, digital cameras, video cameras, single-lens reflex cameras, infrared cameras, stereo cameras, depth cameras, RGB cameras, depth cameras, etc.), charge coupling devices (CCDs), or any type of image sensor. Proximity detectors may include radar sensors, light detection and ranging (LIDAR) sensors, mmWave radar sensors, etc. Acoustic sensors may include microphones, sonar sensors, ultrasonic sensors, etc.

The data acquisition devices 112 may be configured depending on the requirements of a particular application. This may include: image acquisition devices configured to detect a facial attribute of an occupant, image acquisition devices configured to detect at least one portion of a body of an occupant, image acquisition devices configured to detect a hand of an occupant, pressure sensors may be configured to detect a pressure applied by at least one portion of a body of an occupant, pressure sensors may be configured to detect a pressure applied by a hand of an occupant, fingerprint sensors may be configured to detect a fingerprint of an occupant, etc.

Accordingly, each of the data acquisition units may be configured to observe a particular type of data of an occupant of the vehicle 100 or the vehicle's 100 environment and forward the data to the data acquisition processor 214 in order to provide the vehicle with an accurate portrayal of the interior of the vehicle 100 or vehicle's 100 environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

Position devices 114 may include components for determining a position of the vehicle 100. For example, this may include GPS or other GNSS circuitry configured to receive signals from a satellite system and determine a position of the vehicle 100. Position devices 114, accordingly, may provide vehicle 100 with satellite navigation features. The one or more position devices 114 may include components (e.g., hardware and/or software) for determining the position of vehicle 100 by other means, e.g. by using triangulation and/or proximity to other devices such as NIEs.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (sensor data including information such as images, sensor readings, radar signals, depth information from LIDAR, or stereo processing of two or more images) of the environment of the vehicle 100 together with position information, such as GPS coordinates, a vehicle's egomotion, etc., to determine a current location of the vehicle 100 relative to the known landmarks, and refine the determination of the vehicle's location. Certain aspects of this technology may be included in a localization technology such as a mapping and routing model.

Furthermore, the one or more memories 104 may store data, e.g., in a database or in any different format, including occupant information 204 that may correspond to information related to one or more occupants. The data may include information related to the identification of one or more occupants. The data may include face recognition data, fingerprint data, body data/body posture data, behavior data, hand position data, hand posture data, hand gesture data, movement data, action data. The data may further include one or more parameters or settings that are predefined and/or predetermined for one or more occupants, in order to adjust one or more settings related to the vehicle 100.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to perform as described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

In a road environment, it may be desirable for a vehicle 100 to communicate with other entities in order to enhance the road safety and provide more efficient traffic situation within the road environment. Developing communication protocols, such as V2V (vehicle-to-vehicle) in which a vehicle communicates with another vehicle, V2I (vehicle-to-infrastructure), in which a vehicle communicates with an infrastructure item, such as a traffic infrastructure system or a roadside unit, V2N (vehicle-to-network) in which a vehicle communicates with a network function, V2P (vehicle-to-pedestrian) in which a vehicle communicates with a pedestrian are adopted for this purpose, which are combined together as V2X (vehicle-to-everything). Some of these protocols rely on vehicles broadcasting messages to communicate with other entities in a predefined proximity (e.g. V2V), while others rely on a communication through an established network (e.g. V2N).

V2X messages shared using V2X protocols may include various data items that may be in a form of data elements or data frames indicating information including any type of traffic related information under various categories. Such categories may include vehicle information indicating a feature of a vehicle such as driving direction, information relating acceleration/deacceleration of a vehicle etc., georeference information indicating a geographical description e.g. altitude, longitude, latitude related information, road topology information indicating information related to road topology such as road segment type, traffic information indicating traffic related information such as a presence of accident, presence of dangerous situation, infrastructure information indicating information about the infrastructure, such as a presence of a toll or a road side unit, personal information indicating a personal information, communication information that are related to the application layer of the communication protocol, such as an identifier of a station exchanging information, and other information such as type of a station which exchanges information.

Accordingly, the vehicle 100 may generate information based on the vehicle 100, and the vehicle 100 may encode V2X messages for transmission. V2X messages may include information indicating an observation that the vehicle 100 performs using data acquisition devices 112. For example, V2X messages may include information indicating a list of objects that the vehicle 100 has detected in its vicinity using data acquisition devices 112. The vehicle 100 may transmit the list of objects for other vehicles to make other vehicles aware of the objects that the vehicle 100 has detected using data acquisition devices 112.

Figure 3:
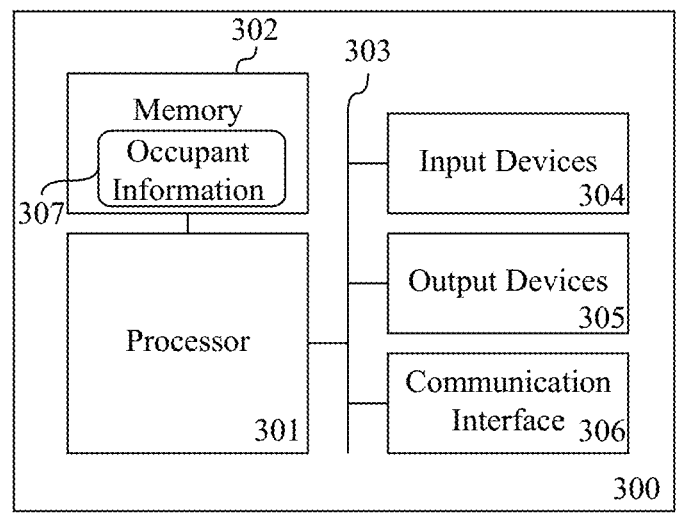
FIG. 3 shows schematically an example of a device for identifying an occupant of a vehicle.

FIG. 3 shows schematically an example of a device for identifying an occupant of a vehicle. A vehicle or an occupant/driver monitoring system may include the device 300 with the input and output devices, and also other entities provided in this disclosure. The vehicle may be the vehicle 100, and the control system 200 (e.g. one or more processors of the control system 200 may include processor of the device 300) may include the device 300 for identifying an occupant of a vehicle. The device 300 includes a processor 301. The processor 301 may be configured to determine an identity for the occupant based on a first sensor data. The first sensor data may include information indicating a detection of a facial attribute of the occupant. The processor 301 may be configured to estimate a behavior for the occupant based on a second sensor data. The second sensor data may include information indicating a detection of a body attribute of the occupant. The processor 301 may be configured to determine a spoofing attempt result indicating whether the occupant attempts a spoofing based on the identity determined using the first sensor data including at least one facial attribute of the occupant and the behavior that the processor 301 estimates using the second sensor data including the detection of at least one body attribute of the occupant.

The device 300 may further include a memory 302. The memory 302 may store the first sensor data and the second sensor data. The device 300 may include an interface 303 coupled to the processor 301. The processor 301 may receive the first sensor data and the second sensor data via the interface 303. The device 300 may include one or more input devices 304 that are configured to provide input to the device 300. Alternatively, the interface 303 may be communicatively coupled to the input devices 304. The input devices 304 may include one or more sensors, other data acquisition units, measurement devices, position devices, or other devices that are configured to provide an input to the device 300.

The input devices 304 may include image acquisition devices, proximity detectors, acoustic sensors, pressure sensors, fingerprint sensors, motion detectors, multimodal sensors, etc., for providing data about the interior of the vehicle or the vehicle's environment. Image acquisition devices may include cameras (e.g., multimodal cameras, standard cameras, digital cameras, video cameras, single-lens reflex cameras, infrared cameras, stereo cameras, depth cameras, RGB cameras, depth cameras, etc.), charge coupling devices (CCDs), or any type of image sensor.

The processor 301 may be configured to receive the first sensor data including information indicating the detection of the facial attribute of the occupant from one of the input devices 304. The processor 301 may be configured to receive the second sensor data including information indicating the detection of the body attribute of the occupant from one of the input devices 304. Alternatively, the interface 303 may receive the first sensor data and the second sensor data from one or more of the input devices 304, and provide the first sensor data and the second sensor data to the processor 301. The interface 303 may receive the first sensor data and the second sensor data from one or more of the input devices 304 and the memory 302 may store the first sensor data and the second sensor data.

The interface 303 may be coupled to the input devices 304 via any communication means. The interface 303 may be coupled to the input devices 304 electrically (e.g. via a wired connection) to receive data that the input devices 304 provide. The device 300 may include a communication interface 306 to manage the communication with the input devices 304. In one alternative example, the communication interface 306 may be communicatively coupled to the input devices 304 (via wired or radio communication), and the communication interface 306 may provide the data received from the input devices 304 to the interface 303. The communication interface 306 may receive the first sensor data and the second sensor data over a communication network. Furthermore, the device 300 may be communicatively coupled to other systems of the vehicle (e.g. advanced driver-assistance systems, electronic control unit, etc.) via the communication interface 306.

The device 300 may further include one or more output devices 305 to provide an output. Alternatively, the interface 303 may be communicatively coupled to the output devices 305. The interface 303 may be coupled to the output devices 305 via any communication means. The interface 303 may be coupled to the output devices 305 electrically (e.g. via a wired connection) to provide an output. The communication interface 306 may also manage the communication with the output devices 305. In one alternative example, the communication interface 306 may be communicatively coupled to the output devices 305 (via wired or radio communication), and the processor 301 may provide an output to the interface 303. The communication interface 306 may receive the output and provide the output to the output devices 305. The communication interface 306 may provide the output over a communication network.

The memory 302 may further include data including occupant information 307 that may correspond to information related to one or more occupants. The occupant information 307 may include identification information related to an identification of one or more occupants. The occupant information 307 may include identification information including face recognition data including information indicating at least one facial attribute for one or more occupants, and/or fingerprint data indicating at least one fingerprint for one or more occupants, and/or body data/body posture data including information indicating at least one body feature or body posture for one or more occupants, and/or behavior data including information indicating at least one behavior for one or more occupants, and/or hand position data including information indicating at least one hand position for one or more occupants, and/or hand posture data including information indicating at least one hand posture for one or more occupants, and/or hand gesture data including information indicating at least one hand gesture for one or more occupants, and/or movement data including information indicating at least one movement for one or more occupants, and/or action data including information indicating at least one action for one or more occupants.

Furthermore, the occupant information 307 may further include condition information for one or more identification information. The condition information may provide information indicating a condition for the identification information to be considered. For example, fingerprint information may include first information indicating a fingerprint of an index finger of the left hand of an occupant and second information indicating a fingerprint of an index finger of the right hand of the occupant. The condition information may indicate for the first information that the first information is to be used with a detection made for the left hand. The condition information for the second information may indicate that the second information is to be used with a detection made for the right hand. In another example, the body posture data may include first information indicating a first body posture while an occupant is not driving and second information indicating a second body posture while the occupant is driving. The condition information for the first information may indicate that the first body posture is when the occupant is not driving, and for the second information, it may indicate that the second body posture is when the occupant is driving.

For example, the data may further include one or more parameters or settings that are predefined and/or predetermined for one or more occupants, in order to adjust one or more settings related to the vehicle.

Figure 4:
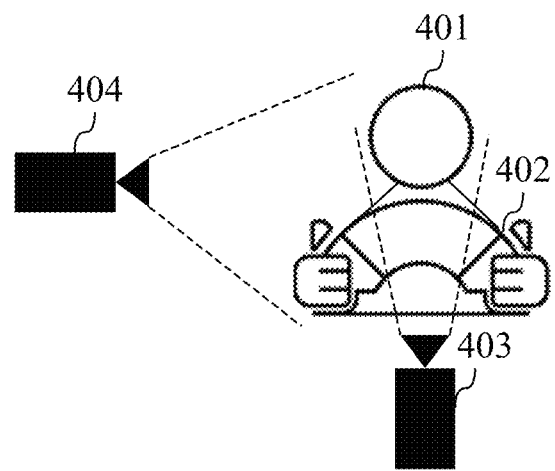
FIG. 4 shows schematically an exemplary illustration for a configuration related to a device.

FIG. 4 shows schematically an exemplary illustration for a configuration related to the device. An occupant 401 is depicted as a driver holding a steering wheel 402. A first sensor 403 including a camera (e.g. a camera in a dashboard of a vehicle) is configured to provide data including information indicating a detection of a facial attribute of the occupant 401. A second sensor 404 including a camera (e.g. a side camera in the vehicle) is configured to provide data including information indicating a detection of the body movement/posture of the occupant 401.

Referring back to FIG. 3 together with FIG. 4, the device 300 may receive data from the first sensor 403 and the second sensor 404. The processor 301 may receive the data from the first sensor 403 as the first sensor data, and the data from the second sensor 404 as the second sensor data. Accordingly, the first sensor data may include information indicating a detected facial attribute of the occupant 401, and the second sensor data may include information indicating a detected body of the occupant 401. For example, the second sensor data may include information indicating a body posture for the occupant 401. The second sensor data may include information indicating a behavior for the occupant 401 related to the detected body of the occupant 401.

The processor 301 may perform an identification for the occupant 401 based on the sensor data. The processor 301 may estimate an identity for the occupant 401 based on the sensor data and the occupant information 307 in the memory 302. The sensor data may include information indicating a detection of an attribute of the occupant, and the occupant information 307 may include information related to the attribute of the occupant.

For example, the processor 301 may determine an identity for the occupant by comparing the sensor data with the face recognition data in the memory 302. The processor 301 may determine the identity by identifying the occupant from information stored for a plurality of occupants provided with the occupant information 307, which the face recognition data of the identified occupant has the most common facial attributes with the facial attributes that the sensor data includes. Furthermore, the processor 301 may use an identification threshold and may consider that an occupant is identified, only if the relationship (e.g. correlation) between the sensor data and the face recognition data which the occupant information 307 may provide is above the identification threshold.

For example, the processor 301 may estimate an identity by comparing the sensor data with the face recognition data in the memory 302. The processor 301 may estimate the identity by identifying an occupant from a plurality of occupants provided with the occupant information 307, in which the face recognition data of the identified occupant has the most common facial attributes with the facial attributes that the sensor data includes. Furthermore, the processor 301 may use an identification threshold and may consider that an occupant is identified, only if the relationship (e.g. correlation) between the sensor data and the face recognition data which the occupant information 307 may provide is above the identification threshold.

The processor 301 may estimate an identity by comparing the sensor data with the fingerprint data in the memory 302. The processor 301 may estimate the identity by identifying an occupant from a plurality of occupants provided with the occupant information 307, in which the fingerprint data of the identified occupant has the most common fingerprint related attributes with the fingerprint attributes that the first sensor data includes. Furthermore, the processor 301 may use an identification threshold and may consider that an occupant is identified, only if the relationship (e.g. correlation) between the first sensor data and the fingerprint data which the occupant information 307 may provide is above the identification threshold.

The processor 301 may estimate an identity by comparing the sensor data with the body data in the memory 302. The body data may include information indicating a body posture. The processor 301 may estimate the identity by identifying an occupant from a plurality of occupants provided with the occupant information 307, in which the body data of the identified occupant has the most common body related attributes with the body attributes that the sensor data includes. Furthermore, the processor 301 may use an identification threshold and may consider that an occupant is identified, only if the relationship (e.g. correlation) between the sensor data and the body data which the occupant information 307 may provide is above the identification threshold.

The processor 301 may estimate the behavior for the occupant based on the sensor data. The processor 301 may receive the sensor data including information indicating the detection of the body attribute of the occupant. For example, body posture may indicate a behavior of an occupant. The processor 301 may estimate a body posture for the occupant via image processing on the sensor data including at least one image of the body of the occupant. The occupant information 307 may include at least one body posture for each of a plurality of occupants. The processor 301 may identify the occupant by comparing the estimated body posture with the at least one body posture for each of a plurality of the occupants in the occupant information 307.

The processor 301 may estimate an identity by comparing the sensor data with the behavior data in the memory 302. The processor 301 may estimate the identity by identifying an occupant from a plurality of occupants provided with the occupant information 307, which the behavior data of the identified occupant has the most common behavior related attributes with the behavior attributes that the sensor data includes. Furthermore, the processor 301 may use an identification threshold, and may consider that an occupant is identified, only if the relationship (e.g. correlation) between the sensor data and the behavior data which the occupant information 307 may provide is above the identification threshold.

The processor 301 may estimate an identity by comparing the sensor data with the hand position data in the memory 302. The processor 301 may estimate the identity by identifying an occupant from a plurality of occupants provided with the occupant information 307, in which the hand position data of the identified occupant has the most common hand position related attributes with the hand position attributes that the sensor data includes. Furthermore, the processor 301 may use an identification threshold and may consider that an occupant is identified, only if the relationship (e.g. correlation) between the sensor data and the hand position data which the occupant information 307 may provide is above the identification threshold.

The processor 301 may estimate an identity by comparing the sensor data with the hand gesture data in the memory 302. The processor 301 may estimate the identity by identifying an occupant from a plurality of occupants provided with the occupant information 307, in which the hand gesture data of the identified occupant has the most common hand gesture related attributes with the hand gesture attributes that the sensor data includes. Furthermore, the processor 301 may use an identification threshold and may consider that an occupant is identified, only if the relationship (e.g. correlation) between the sensor data and the hand gesture data which the occupant information 307 may provide is above the identification threshold.

The processor 301 may estimate an identity or determine the behavior of the occupant by comparing the sensor data with the action data in the memory 302. The processor 301 may determine the behavior by detecting an action according to the sensor data and identifying the action from the action data provided with the occupant information 307, which the action data of the identified occupant has the most common action related attributes with the identified action attributes that the sensor data includes. Furthermore, the processor 301 may use an identification threshold and may consider that the action is detected, only if the relationship (e.g. correlation) between the sensor data and the action data which the occupant information 307 may provide is above the identification threshold.

The sensor data may include a plurality of images related to a body of the occupant. The processor 301 may estimate the behavior of the occupant by detecting an action via an action detection method that is performed spatiotemporally over the plurality of images. Accordingly, the processor 301 may detect the action and estimate the behavior of the occupant based on the detected action. The processor 301 may detect the action based on movements and/or gestures of the occupant. The processor 301 may further detect the action based on at least one interaction of the occupant with the vehicle. Such interactions may include occupant's movements to interact with buttons, switches, or other means to receive instructions from the occupant or use other functions provided by the vehicle.

The processor 301 may compare the sensor data with an occupant information 307 in the memory 302 using any method. Based on the type of the sensor data, the processor 301 may process the sensor data in order to obtain information related to an attribute. For example, the sensor data may include an image of the face of the occupant, and the processor 301 may process the image in order to obtain and/or estimate the facial attributes provided with the sensor data.

The sensor data may include information indicating the detection of an attribute of the occupant in a plurality of time instances. For example, the sensor data may include a plurality of images including at least a portion of the body of the occupant taken at the plurality of time instances (e.g. video), and the processor 301 may process the plurality of images in order to obtain and/or estimate one or more body attributes provided with the sensor data. The processor 301 may estimate the behavior for the occupant based on the plurality of images accordingly.

The sensor data may include at least one image from a side cam in a vehicle that is configured to detect a portion of the body of the occupant in the vehicle. The processor 301 may estimate a behavior for the occupant by estimating a body posture for the occupant from the at least one image from the side cam in the vehicle. Similarly, the processor 301 may further detect a location for at least a portion of the body of the occupant from the sensor data using the at least one image, and the processor 301 may estimate the behavior based on the location for at least the portion of the body of the occupant. The processor 301 may detect the location according to an object located at a fixed position (e.g. seat, driving wheel, door, window, etc.) in the vehicle. The processor 301 may estimate the behavior based on an image in accordance with at least one image related to an earlier time period, or at least one image related to a later time period. The processor 301 may detect the behavior based on the at least one image in accordance with at least one image related to an earlier time period, or at least one image related to a later time period.

The sensor data may include at least one sensor reading from a pressure sensor located in the seat of the occupant. The sensor data may include a plurality of sensor readings from the pressure sensor. The sensor data may include a plurality of sensor readings from a plurality of pressure sensors located in the seat. Similar to the above-mentioned examples, the processor 301 may detect a body related information (e.g. body posture, and/or location of a portion of the body, and/or behavior) and the determined occupant body status may indicate the detected information based on the one or more pressure sensors.

The sensor data may include at least one sensor reading from a pressure sensor located in a driving wheel of the vehicle configured to detect a hand position for the occupant. The sensor data may include a plurality of sensor readings from the pressure sensor. The sensor data may include a plurality of sensor readings from a plurality of pressure sensors located on the driving wheel. The processor 301 may detect a body related information (e.g. hand posture, and/or location of a hand on the driving wheel, and/or behavior) and the determined occupant body status may indicate the detected information based on the one or more pressure sensors located on the driving wheel.

The sensor data may include at least one sensor reading from a motion sensor located around the driving wheel of the occupant configured to detect a hand movement for the occupant. The sensor data may include a plurality of sensor readings from the pressure sensor. The sensor data may include a plurality of sensor readings from a plurality of motion sensors located around the driving wheel. The processor 301 may detect a body related information (e.g. hand movement, and/or hand gesture) and the determined occupant body status may indicate the detected information based on the one or more motion sensors located on the driving wheel.

Accordingly, the processor 301 may compare the sensor data to the occupant information 307 in the memory 302 by comparing the determined occupant body status and the occupant information 307. The skilled person would appreciate that the examples above are may be provided for other types of attributes and corresponding occupant information 307 in the memory 302.

Furthermore, the processor 301 may authorize and/or authenticate the occupant based on the identification from the sensor data. The occupant information 307 may include information indicating for which actions an identified occupant is authorized, and prevent certain actions from the identified occupant based on the information. For example, the occupant information 307 may include that an identified occupant is a minor and cannot take over any driving function. Accordingly, the processor 301 may prevent the identified occupant to take over a driving function.

Furthermore, the sensor data may include information indicating the detection of the occupant based on a plurality of sensor modalities. The sensor providing the sensor data may include a multimodal sensor that is configured to detect attributes of the occupant from a plurality of modalities. Accordingly, the sensor data may include a first modality information indicating the detection of the occupant from a first modality, and a second modality information indicating the detection of the occupant from a second modality. The processor 301 may be further configured to use the first modality information and the second modality information to determine the spoofing attempt result.

The processor 301 may be configured to compare the first modality information with the second modality information and determine whether the first modality information is in relation to the second modality information. The occupant information 307 may further include information relating to the detection of the occupant based on the first modality and the second modality, and the processor 301 may be configured to determine whether the first modality information and the second modality information match the occupant information 307. In case there is not a match above a predetermined threshold, the processor 301 may be configured to determine the spoofing attempt result indicating the occupant attempts a spoofing.

Referring to FIG. 4 as an example, the second sensor 404 may include a multimodal camera. The multimodal camera may be configured to provide a first image of the face of the occupant as a near-infrared image (NIR) as a first modality, and a second image of the face of the occupant as a depth image of the occupant as a second modality. Using the combination of the near-infrared image and the depth image may complement each other, since the depth image may indicate a spoofing attempt made via two dimensional spoofing means, such as a facial print of a person, or a video of a person that may be held by the occupant in order to perform a spoofing attack, while the near-infrared image might include more characteristic facial attributes that the processor 301 may use to identify the occupant.

The processor 301 may generate a first spoofing attempt score based on the first modality information by performing image processing to detect a spoofing attempt. The processor 301 may generate a second spoofing attempt score based on the second modality information by performing image processing to detect a spoofing attempt. The processor 301 may then combine the first spoofing attempt score and the second spoofing attempt score in order to determine the spoofing attempt result.

The processor 301 may employ a neural network, such as a convolutional neural network in order to generate the spoofing attempt scores and accordingly determine the spoofing attempt result based on the first modality information and the second modality information. As the information of different modalities may be of a different nature, the processor 301 may use different convolutional neural network models for each of the modalities. The processor 301 may generate the first spoofing attempt score by providing the first modality information as an input to a first convolutional neural network based on a first model parameters in the memory 302 and the processor 301 may generate the second spoofing attempt score by providing the second modality information as an input to a second convolutional neural network based on a second model parameters in the memory 302.

The convolutional neural network models may include a training stage and an inference stage. The convolutional neural network models may receive images of various modalities, including near-infrared images and depth images of faces, in which a portion of the training images include spoofing attacks, and they may adjust corresponding model parameters in the memory 302 according to the calculation of corresponding spoofing attempt scores at the training stage. The model parameters may include a weight or a bias related to a neuron or a layer.

At the inference stage, the processor 301 may provide the first modality information to the first convolutional neural network configured to generate the first spoofing attempt score based on the first model parameters as an output, and the processor 301 may provide the second modality information to the second convolutional neural network configured to generate the second spoofing attempt score based on the second model parameters as an output. The processor 301 may then perform a decision-level fusion and combine the first spoofing attempt score and the second spoofing attempt score to determine the spoofing attempt result.

Furthermore, the inference stage may provide feedback to the training stage, such that in case at least one of the scores or the combined score differs from a decision threshold within a predefined error range, the at least one corresponding neural network may adjust corresponding model parameters in the memory 302 based on the predefined error range. The use of near-infrared images and depth images with respect to generating spoofing attempt scores are exemplary, and the processor 301 may provide input to neural networks according to any type of modalities (e.g. body attributes, behavior) provided by the sensor data discussed herein.

Each one of the methods provided herein with respect to determining an identity for the occupant, and estimating a feature related to the occupant, such as behavior for the occupant, may be combined with a desire to enhance the identification of the occupant.

Figure 5:
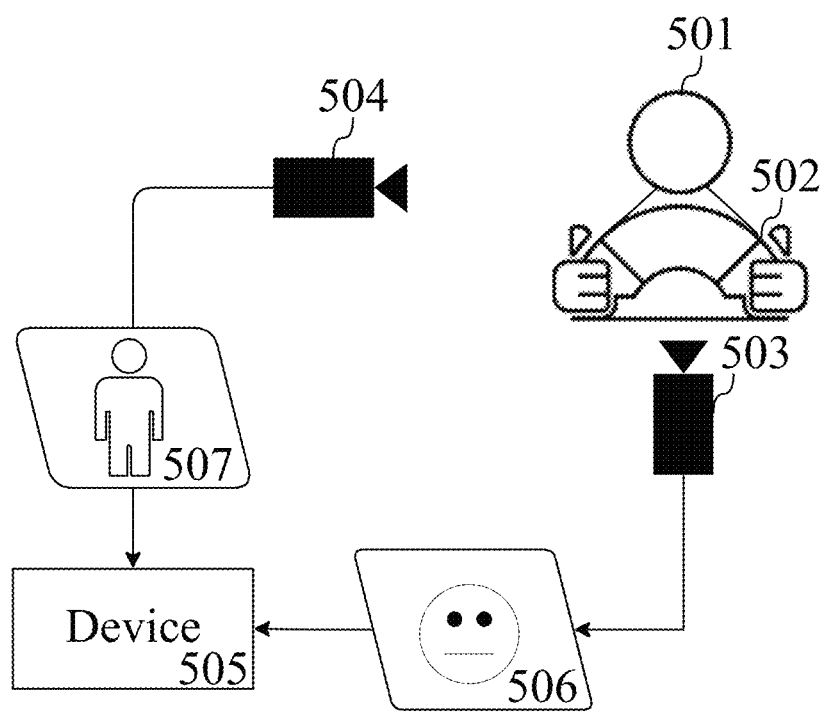
FIG. 5 shows schematically an exemplary illustration including a device for identifying an occupant.

FIG. 5 shows schematically an exemplary illustration including a device for identifying an occupant. An occupant 501 is depicted as a driver holding a steering wheel 405. A first sensor 503 including a camera (e.g. a camera in a dashboard of a vehicle) is configured to provide a first sensor data 506 including a facial image of the occupant 501 as information indicating a detection of a facial attribute of the occupant 501. A second sensor 504 including a camera (e.g. a side camera in the vehicle) is configured to provide a second sensor data 507 including a body image of the occupant 501 as information indicating a detection of a body attribute such as the body movement/posture of the occupant 501. The first sensor 503 and the second sensor 504 are coupled to the device 505 for identifying the occupant 501. The first sensor 503 and the second sensor 504 may continuously provide the first sensor data 506 and the second sensor data 507 respectively to the device 505, such as real-time capture of the occupant 501.

The device 505 may initiate an identification function in order to authenticate the occupant 501. The device 505 may initiate the identification function at the beginning of a journey with the vehicle. The device 505 may initiate the identification function, in case an occupant requests to take over the control of at least one driving function of the vehicle. The device 505 may initiate the identification function, in case an occupant requests to change a setting related to a function, such as a driving function of the vehicle. The driver may need to be authenticated or authorized to be able to drive the vehicle, or the occupant 501 may need to be authenticated or authorized before using the vehicle. Furthermore, the device 505 may initiate the identification function from time to time, such as periodically, to authenticate one or each of the occupants while the vehicle is being used.

Accordingly, a processor of the device 505 may determine an identity for the occupant 501 based on the first sensor data 506 including the facial image of the occupant 501 using occupant information in a memory. Furthermore, the device 505 may estimate a behavior for the occupant 501 based on the second sensor data 507 including the body image of the occupant 501. The occupant information in the memory may further include at least one behavior for the identified occupant. For example, the device 505 may estimate the behavior by estimating a body posture for the occupant 501, and the occupant information may include at least one body posture at least for the identified occupant. The device 505 may determine whether the estimated body posture for the occupant 501 corresponds to the at least body posture for the identified occupant. The device 505 may employ certain methods to determine whether the estimated body posture for the occupant 501 corresponds to (or matches) to the at least body posture for the identified occupant stored in the occupant information.

The occupant information in the memory may further include at least one behavior for an occupant as information based on certain characteristics to identify the occupant 501, since the behavior may also be employed to identify characteristic features for a person. Accordingly, the device 505 may also determine a second identity based on the estimated behavior of the occupant 501 using the second sensor data 506, such as independent from determining the identity based on the first sensor data 506, according to the occupant information in the memory. The device 505 may determine whether the determined identity for the occupant 501 based on the first sensor data 506, corresponds to the determined second identity for the occupant 501 based on the estimated behavior using the second sensor data 507.

Accordingly, the device 505 may determine a spoofing attempt result indicating whether the occupant 501 attempts a spoofing based on the determined identity and the estimated behavior of the occupant 501. In case the estimated behavior of the occupant 501 does not correspond to the behavior information in the occupant information, or in case the determined identity for the occupant 501 based on the first sensor data 506 does not correspond to the determined second identity for the occupant 501 based on the estimated behavior using the second sensor data 507, the device 505 may determine the spoofing attempt result indicating that the occupant 501 attempts a spoofing.

Figure 6:
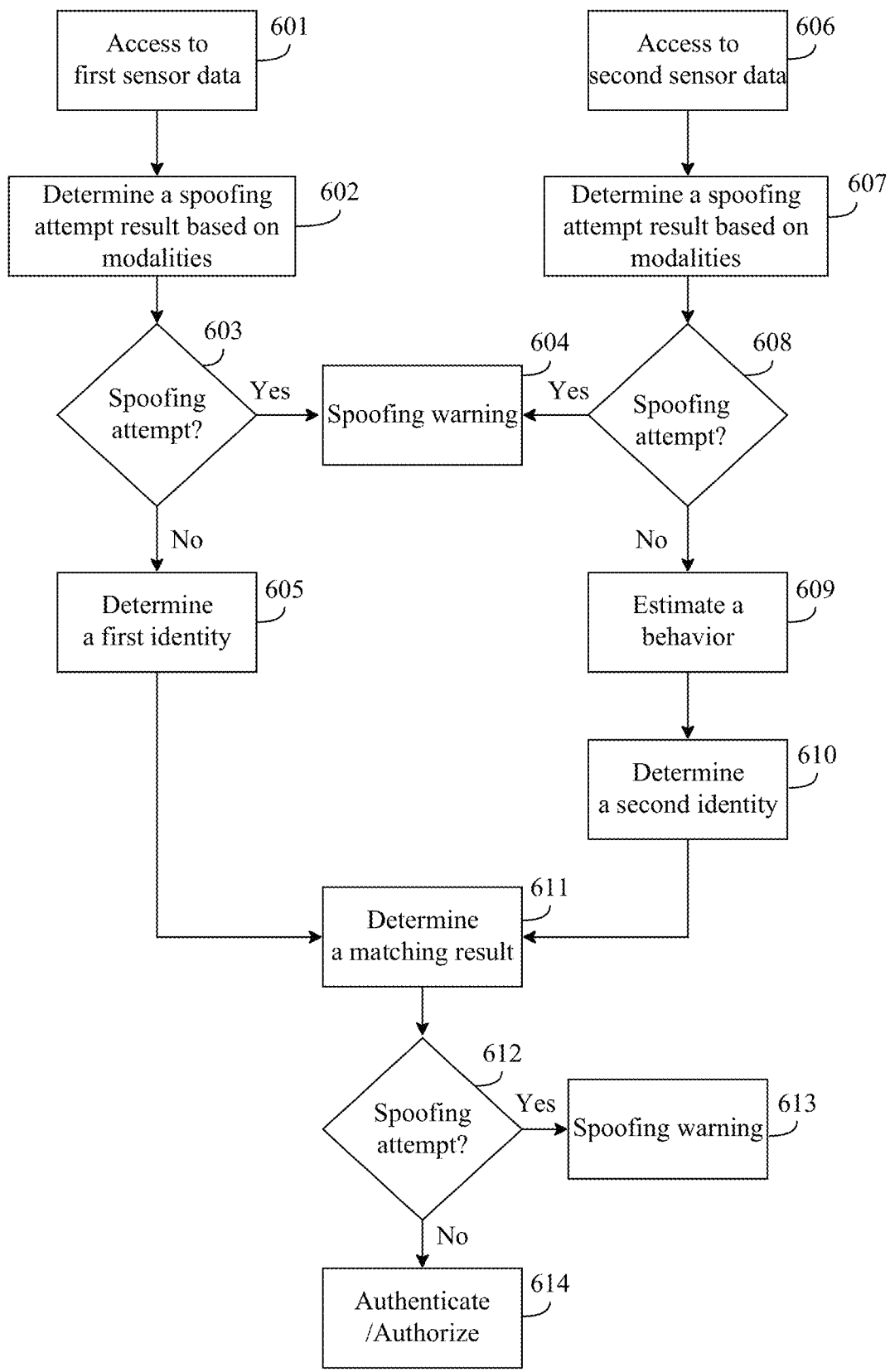
FIG. 6 shows schematically a flow diagram for an identification function.

FIG. 6 shows schematically a flow diagram for an identification function. As discussed herein, a device for identifying an occupant of a vehicle may perform the identification function. The device may access 601 to a first sensor data provided by a facial camera of the vehicle. The first sensor data may include a facial image of the occupant based on at least two modalities, such as a depth image and a near-infrared image. The device may determine 602 a spoofing attempt result based on a processing of the facial image for each of the modalities provided or based on a comparison of the modality information with each other.

The device may check 603 whether the spoofing attempt result indicates that the occupant attempts a spoofing based on the modality information of at least two modalities. In case the spoofing attempt result indicates that the occupant attempts a spoofing, the device may provide a spoofing warning 604 using output devices of the device. In case the spoofing attempt result indicates that the occupant does not attempt a spoofing, the device may determine 605 a first identity for the occupant based on the first sensor data.

Furthermore, the device may access 606 to a second sensor data provided by a side camera/body camera of the vehicle. The second sensor data may include a body image of the occupant based on at least two modalities, such as a depth image and a near-infrared image. The device may determine 607 a spoofing attempt result based on a processing of the facial image for each of the modalities provided or based on a comparison of the modality information with each other.

The device may check 608 whether the spoofing attempt result indicates that the occupant attempts a spoofing based on the modality information of at least two modalities. In case the spoofing attempt result indicates that the occupant attempts a spoofing, the device may provide a spoofing warning 604 using output devices of the device. In case the spoofing attempt result indicates that the occupant does not attempt a spoofing, the device may estimate 609 a behavior for the occupant based on the second sensor data. The device may further determine 610 a second identity for the occupant based on the estimated behavior for the occupant.

The device may determine 611 a spoofing attempt result based on a matching result according to the determined first identity and the determined second identity. In case the spoofing attempt result 612 indicates that the occupant attempts a spoofing, such as. the first identity does not match the second identity, or the estimated behavior based on the second sensor data does not match a behavior of the occupant identified as the first identity, the device may provide a spoofing warning 613 using output devices of the device. In case the spoofing attempt result indicates that the occupant does not attempt a spoofing, the device may authenticate or authorize 614 the occupant.

Referring back to FIG. 5, the processor of the device 505 may further be configured to initiate a continuous spoofing detection function in order to detect potential spoofing attempts. The processor of the device 505 may continuously or within predefined or random periods of time check whether a sensor data indicates a spoofing attempt performed by one of the occupants.

The processor may be configured to receive the second sensor data 507 indicating the detection of the body attribute for a period of time, such as plurality of images provided by the second sensor 504 in the vehicle. The processor may estimate a behavior for the occupant based on the second sensor data 506 provided in this manner. The processor may determine a spoofing attempt result based on the second sensor data 506 spatiotemporally.

The processor may detect an action of the occupant spatiotemporally. Furthermore, the memory of the device 505 may include predefined spoofing behavior information indicating predefined features related to body attributes and/or movements that may be linked to a spoofing action. For example, the predefined spoofing behavior information may include reference information indicating how at least one body portion might spatially and temporally behave (move) when a person wearing a mask. The processor may determine the spoofing attempt result based on a comparison of the detected action of the occupant with the reference information. In case the comparison indicates that the detected action corresponds to the reference information, the processor may determine the spoofing attempt result indicating that the occupant attempts a spoofing by wearing a mask.

Furthermore, the processor may access to a movement data of the vehicle. The movement data may include information indicating a movement of the vehicle, in at least one instance of time, such as at least one kinematic force that the vehicle experiences at the at least one instance of time. The processor may detect the action of the occupant for a period of time, and the processor may determine whether the detected action of the occupant corresponds to the information indicating at least one kinematic force that the vehicle experiences at the at least one instance of time in which the at least one instance of time is within the period of time of the detected action. For example, acceleration forces push occupants towards the back and deceleration towards the front due to inertia. Similarly, lateral movements following the curvature of the road or a lateral maneuver like a lane change or turn create similar lateral effects. The processor may determine whether the detected action of the occupant corresponds to such effects. In case the processor determines that the detected action of the occupant does not correspond to effects that may be caused by the at least one kinematic force that the vehicle experience at the at least one instance of time, the processor may determine the spoofing attempt result indicating that the occupant attempts a spoofing due to incompatible detect action with the forces that the vehicle experience at the at least one instance of time based on the movement data.

Furthermore, the processor may estimate a first behavior for the occupant at a first period of time and a second behavior for the occupant at a second period of time. The processor may determine the spoofing attempt result based on the first behavior and the second behavior. The processor may determine the spoofing attempt result by comparing the first behavior and the second behavior. In case the comparison indicates that a change or a difference between the first behavior and the second behavior is above a predefined threshold, the processor may determine the spoofing attempt result indicating that the occupant attempts a spoofing due to the change of the estimated behavior.

For example, the processor may estimate the first behavior by estimating a first body posture based on the sensor data relating to a first period of time. The processor may further estimate the second behavior by estimating a second body posture based on the sensor data relating to a second period of time. The processor may compare the first body posture and the second body posture and obtain a spoofing attempt score indicating a difference and/or change of the body posture of the occupant based on the first body posture and the second body posture. In case the difference and/or change of the body posture, namely the spoofing attempt score is above a predefined threshold, the processor may determine the spoofing attempt result indicating that the occupant attempts a spoofing due to the change of the estimated behavior.

Furthermore, the processor may detect a first action of the occupant at a first period of time and a second action of the occupant at a second period of time. The processor may determine the spoofing attempt result based on the first action and the second action. The processor may determine the spoofing attempt result by comparing the first action and the second action to obtain a difference score. In case the comparison indicates that a change or a difference score between the first action and the second action is above a predefined threshold, the processor may determine the spoofing attempt result indicating that the occupant attempts a spoofing due to the change of the detected actions.

There may also be spoofing actions performed with a help of another occupant. Accordingly, the device 505 may access to a third sensor data including information indicating a body attribute of another occupant of the vehicle. The processor may extract the third sensor data from the second sensor data 507 in a constellation, where the side camera is configured to capture another occupant. Alternatively, a third camera may provide the information related to the third sensor data. The device 505 may be configured to perform the continuous spoofing detection function based on the third sensor data including information indicating a body attribute of another occupant of the vehicle in order to determine a spoofing attempt result for the occupant in a similar manner disclosed herein.

Furthermore, the device 505 may be configured to combine any of the spoofing attempt results disclosed herein that are determined in accordance with various aspects and determine whether the occupant attempts a spoofing based on the combination of a plurality spoofing attempt results. Each of the spoofing attempt results may include a score, or a probability indicating a probability of a spoofing attempt based on the corresponding determination. The combination of the spoofing attempt results may include assigning a predefined weight parameter for each of the spoofing attempt results.

Figure 7:
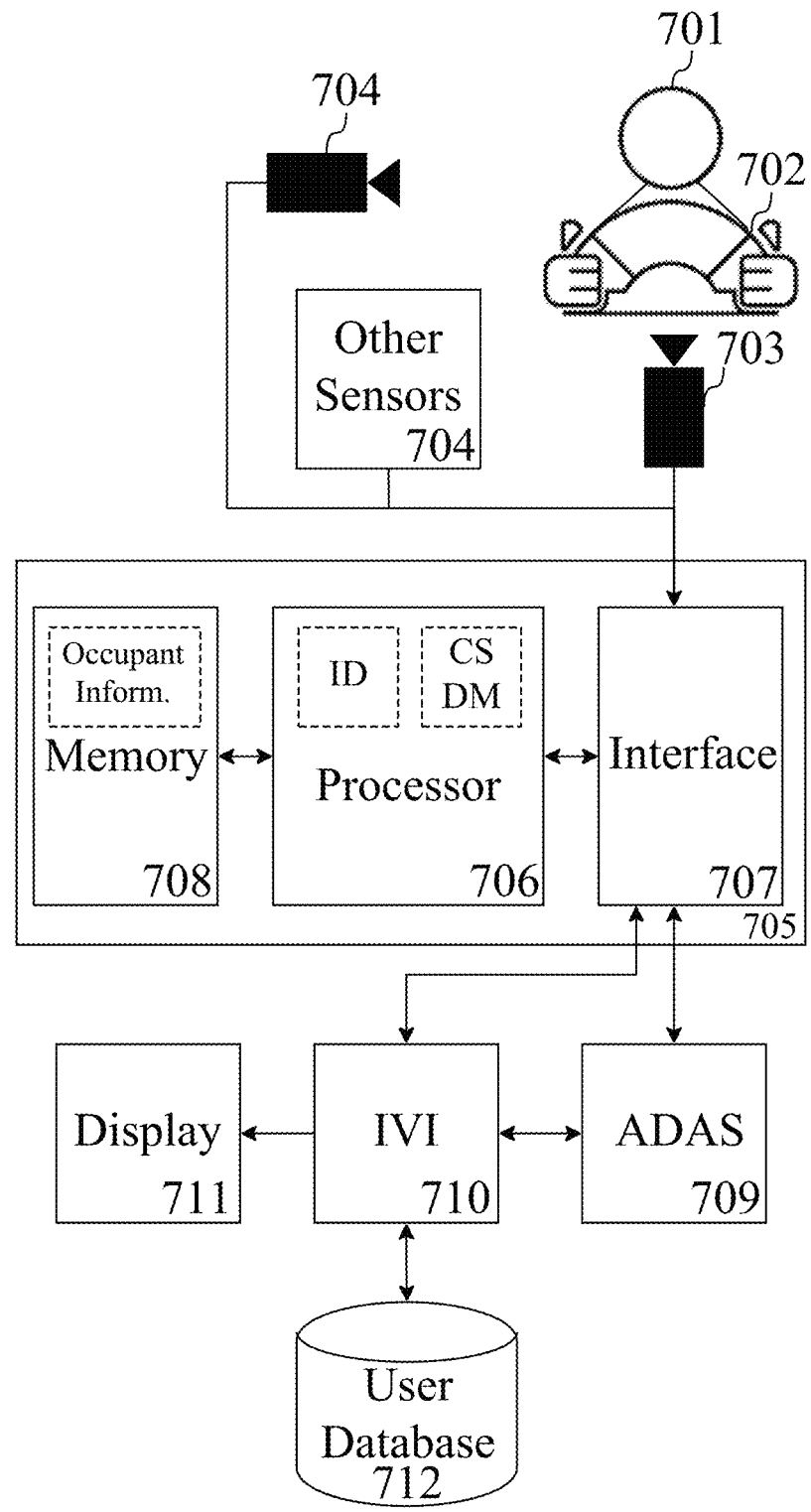
FIG. 7 shows schematically an example of an illustration including a driving monitoring system including a device for identifying an occupant of a vehicle.

FIG. 7 shows schematically an example of an illustration including a driving monitoring system including a device for identifying an occupant of a vehicle. A vehicle or an occupant/driver monitoring system may include the device with the input and output devices, and also other entities provided in this disclosure. An occupant 701 is depicted again as a driver holding a steering wheel 702. A first sensor 703 including a camera (e.g. a camera in a dashboard of a vehicle) is configured to provide a first sensor data including a facial image of the occupant 701 as information indicating a detection of a facial attribute of the occupant 701. A second sensor 704 including a camera (e.g. a side camera in the vehicle) is configured to provide second sensor data including a body image of the occupant 701 as information indicating a detection of a body attribute such as the body movement/posture of the occupant 701.

The first sensor 703, the second sensor 704, and the other sensors are coupled to the device 705. Furthermore, there may be other sensors 704, such as a pressure sensor and/or a motion sensor may provide information indicating a detection of a body attribute of the occupant. For example, other sensors 704 may include a motion sensor configured to detect a movement of the occupant 701, and/or a pressure sensor configured to detect a pressure applied by the occupant 701 (e.g. a pressure sensor located at a seat of the vehicle, on which the occupant 701 is located). Accordingly, other sensors 704 may provide information indicating a detection of a body attribute of the occupant 701 based on further modalities. The first sensor 703 and the second sensor 704 and the other sensors 704 may continuously provide their output to the device 705.

The device 705 may include a processor 706, an interface 707, and a memory 708 that may store occupant information. The interface may receive output information of the first sensor 703, the second sensor 704, and other sensors 704. The interface 707 may receive the output information of the sensors as the first sensor data and the second sensor data. The interface 707 may receive the output information of the sensors and the processor 706 may process the output information of the sensors to obtain the first sensor data and the second sensor data. Accordingly, the processor 706 may receive the first sensor data including information indicating a detection of a facial attribute of the occupant 701, and the second sensor data including information indicating a detection of a body attribute of the occupant 701.

Furthermore, the device 705 may be communicatively coupled via at least the interface 707 to an advanced driver-assistance system (ADAS) 709 of the vehicle and to an in-vehicle infotainment system (IVI) 710 of the vehicle. The in-vehicle infotainment system (IVI) 710 may be coupled to a display 711 of the vehicle and a storage 712 including user database including various information related to at least one occupant.

The processor 706 of the device 705 may be configured to determine an identity for the occupant 701 based on the first sensor data, estimate a behavior for the occupant 701 based on the second sensor data and determine a spoofing attempt result as provided in this disclosure. Furthermore, the processor 706 may be configured to initiate an identification function and a continuous spoofing detection function via its respective modules as provided in this disclosure.

The device 705 may receive the movement data from the advanced driver-assistance system (ADAS) 709 of the vehicle via the interface 707. The advanced driver-assistance system (ADAS) 709 may provide the movement data including at least one kinematic force that the vehicle experiences. The advanced driver-assistance system (ADAS) 709 may provide the movement data including information related to driving of the vehicle, such as a velocity, acceleration, estimated route, etc., that may indicate at least one kinematic force that the vehicle experiences, and the processor 706 may calculate at least one kinematic force that the vehicle experiences based on the movement data which the advanced driver-assistance system (ADAS) 709 may provide.

Furthermore, the processor 706 may generate a spoofing detection signal in case the processor 706 determines that the occupant 701 attempts a spoofing as disclosed herein. The processor may output the spoofing detection signal to the interface 707. The interface 707 may provide the spoofing detection signal indicating that the occupant 701 attempts a spoofing to the advanced driver-assistance system (ADAS) 709 and/or the in-vehicle infotainment system (IVI) 710. Based on the detection of spoofing, the advanced driver-assistance system (ADAS) 709 and/or the in-vehicle infotainment system (IVI) 710 may take necessary actions, such as disabling access to certain functions of the advanced driver-assistance system (ADAS) 709 and/or the in-vehicle infotainment system (IVI) 710, taking over the control of the vehicle by the advanced driver-assistance system (ADAS) 709, initiating an emergency maneuver to stop the journey with the vehicle.

Furthermore, the processor 706 may encode a message including an authentication request for the occupant 701 based on the spoofing attempt result. The processor 706 may generate a display information to be displayed on the display 711 of the vehicle, and the display information may include an indication of an entry for a username and/or password for the identified occupant or an occupant that has the username and/or password in the occupant information stored in the memory 708. The interface 707 may provide the message to the in-vehicle infotainment system (IVI) 710, so that the occupant 701 may provide the information via a user interface of the in-vehicle infotainment system (IVI) 710. Alternatively, the in-vehicle infotainment system (IVI) 710 and/or the advanced driver-assistance system (ADAS) 709 may initiate a similar function to request username and/or password of the occupant 701. Furthermore, or as an alternative, a predefined secret question may be requested from the occupant 701.

In response to a request from the occupant 701, the occupant 701 may provide a response using the user interface. The device 705 may receive the response of the occupant 701 via the interface 707 and determine whether the response provided by the occupant 701 in response to the request is correct. Accordingly, the processor 705 may generate an authentication signal. Alternatively, in case the request is provided by the in-vehicle infotainment system (IVI) 710 and/or the advanced driver-assistance system (ADAS) 709, the respective entity may determine whether the response provided by the occupant 701 in response to the request is correct based on information stored in the user database 712. The information provided by the occupant 701 via the user interface may include text, an audio input, or a visual input.

Furthermore, the processor 706 may generate an authentication signal to indicate that no spoofing has been detected by the processor 706 to be provided to the in-vehicle infotainment system (IVI) 710 and/or the advanced driver-assistance system (ADAS) 709 via the interface 707. Based on the authentication signal, the advanced driver-assistance system (ADAS) 709 may authorize the occupant 701 to perform predefined driving-related actions. The processor 706 may further generate an authorization signal to indicate that the occupant 701 is authorized to perform predefined driving-related actions.

The processor 706 may further generate an occupant identification signal for an occupant which the processor 706 identifies using at least the identification function. The identification signal may include a unique identifier to indicate the identity of the occupant 701. The processor 706 may provide the identification signal to the in-vehicle infotainment system (IVI) 710 and/or the advanced driver-assistance system (ADAS) 709 via the interface 707, so that the in-vehicle infotainment system (IVI) 710 and/or the advanced driver-assistance system (ADAS) 709 may perform personalized actions, such as adjusting safety and/or comfort settings for the identified occupant according to predefined settings stored in the user database 712. The comfort settings may include adjusting settings for providing the favorite music of the identified occupant, adjusting the seat of the identified occupant to predefined settings, adjusting the temperature of the interior of the vehicle to a predefined temperature for the occupant 701, etc. For example, the advanced driver-assistance system (ADAS) 709 may determine the actions that the identified occupant is authorized for based on the identification signal. The in-vehicle infotainment system (IVI) 710 may adjust at least one setting according to at least one predefined setting for the identified occupant that is provided in the user database 712.

Figure 11:
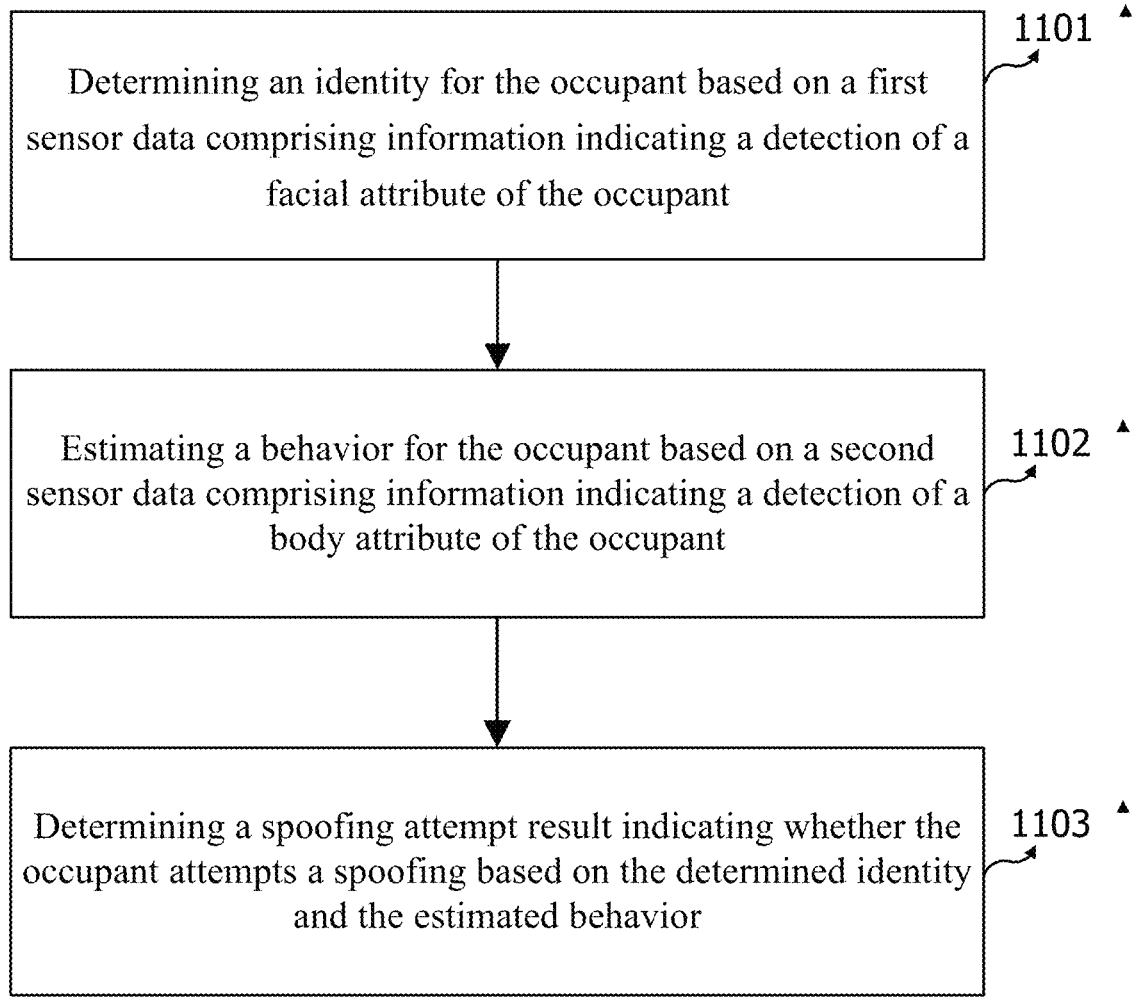
FIG. 11 shows schematically an example of a method.

FIG. 11 shows schematically an example of a method. The method may include determining 1101 an identity for the occupant based on a first sensor data including information indicating a detection of a facial attribute of the occupant, estimating 1102 a behavior for the occupant based on a second sensor data including information indicating a detection of a body attribute of the occupant, and determining 1103 a spoofing attempt result indicating whether the occupant attempts a spoofing based on the determined identity and the estimated behavior. A non-transitory computer-readable medium including one or more instructions that when executed on a processor may cause the processor to perform the method.

Figure 8:
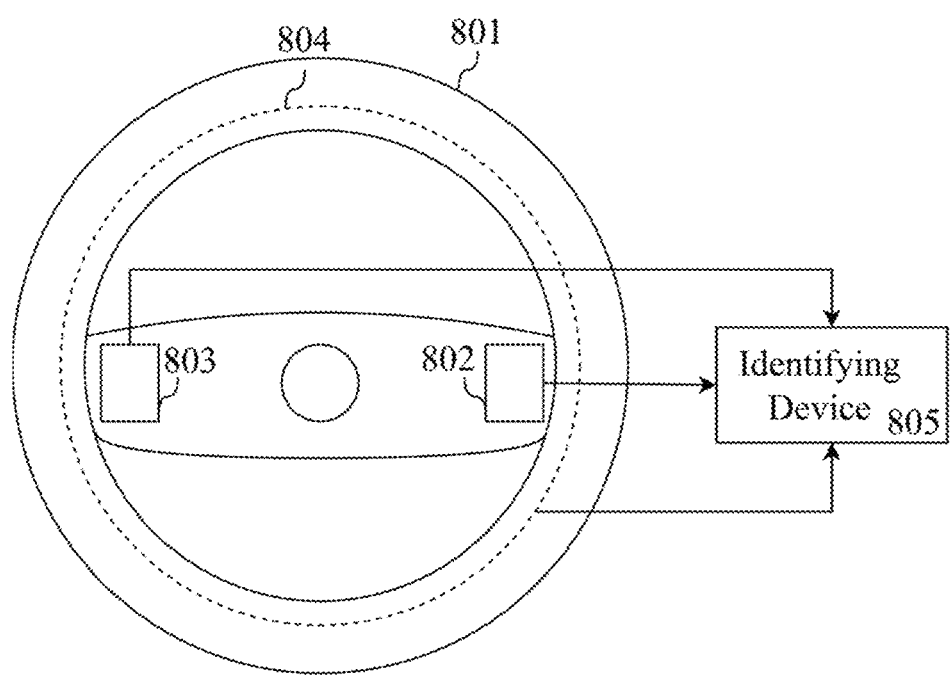
FIG. 8 shows schematically an exemplary illustration including a device for identifying an occupant of a vehicle.

FIG. 8 shows schematically an exemplary illustration including a device for identifying an occupant of a vehicle. A vehicle or an occupant/driver monitoring system may include the device 805 with the input and output devices, and also other entities provided in this disclosure. The device 805 for identifying an occupant of a vehicle may include the device provided according to FIG. 3, or other corresponding devices provided in this disclosure. The vehicle may include a steering wheel 801 including at least one fingerprint scanner 802, 803. The at least one fingerprint scanner 802, 803 may include a fingerprint sensor configured to provide sensor data including information indicating a detection of a fingerprint of the driver as an occupant, as a sensor data of a first modality. Although the fingerprint sensor is depicted on the steering wheel 801, the vehicle may include fingerprint sensors in other locations within the vehicle for other occupants.

Furthermore, the steering wheel 801 may include a pressure sensor 804 that is configured to detect an interaction of the driver with the steering wheel 801. The interaction of the driver with the steering wheel 801 may include a position of a hand or hands of the driver, pressure applied by at least one hand of the driver, a motion of at least one hand of the driver, a change in the pressure applied by at least one hand of the driver, etc. The pressure sensor 804 may provide information indicating pressure applied by the hand of the driver as sensor data of a second modality. The sensor data including pressure information may relate to an instance of time, a period of time, or continuously.

Accordingly, the device 805 may receive the sensor data from the fingerprint sensor as a first sensor data, and the sensor data from the pressure sensor as a second sensor data. For occupants other than the driver, other types of sensors may provide information indicating the interaction of the occupant. A camera configured to capture hand movements of an occupant or a motion sensor configured to detect a motion of at least a hand of an occupant may be configured to provide the sensor data of a second modality, including information indicating an interaction of the occupant using a hand.

The device 805 may initiate an identification function in order to identify the occupant. The device 805 may initiate the identification function at the beginning of a journey with the vehicle. The device 805 may initiate the identification function, in case an occupant requests to take over the control of at least one driving function of the vehicle. The device 805 may initiate the identification function, in case an occupant requests to change a setting related to a function, such as a driving function of the vehicle. The driver may need to be authenticated or authorized to be able to drive the vehicle, or the occupant may need to be authenticated or authorized before using the vehicle. Furthermore, the device 805 may initiate the identification function from time to time, such as periodically, to authenticate one or each of the occupants while the vehicle is being used.

The processor of the device 805 may determine an identity for the occupant for the identification function based on the first sensor data including fingerprint information of the occupant. The processor may use any type of fingerprint identification function to determine the identity of the occupant based on the first sensor data based on the occupant information including predefined fingerprint information for at least one occupant stored in the memory of the device 805. Alternatively, the device 805 may communicate with an external storage via the interface to receive or access the occupant information. The device 805 may store the determined identity of the occupant in the memory.

The device 805 may also detect a spoofing attempt based on the first sensor data including fingerprint information of the occupant. The processor of the device 805 may employ a neural network, such as a convolutional neural network in order to generate a spoofing attempt score and accordingly determine the spoofing attempt result based on the first sensor data. The processor may generate the spoofing attempt score by providing the first sensor data as an input to a convolutional neural network based on model parameters in the memory of the device 805.

The convolutional neural network model to detect the spoofing attempt may include a training stage and an inference stage. The convolutional neural network model may receive fingerprint information for various occasions, in which a portion of the training fingerprint information include spoofing attacks, and the convolutional neural network model may adjust corresponding model parameters in the memory according to the calculation of corresponding spoofing attempt score with respect to the fingerprint information of various occasions at the training stage. The model parameters may include a weight or a bias related to a neuron or a layer.

At the inference stage, the processor may provide the fingerprint information of the occupant received with the first sensor data to the convolutional neural network configured to generate the spoofing attempt score based on the model parameters as an output. The processor may then determine the spoofing attempt result indicating whether the occupant attempts a spoofing based on the output of the convolutional neural network. Furthermore, the inference stage may provide feedback to the training stage, such that in case at least one of the scores or the combined score differs from a decision threshold within a predefined error range, the neural network may adjust corresponding model parameters in the memory based on the predefined error range.

The processor may estimate a behavior for the occupant based on the second sensor data including information indicating the interaction of the occupant with the vehicle. In this example, the second sensor data include pressure information detected on the steering wheel 801. Based on the second sensor data, the processor may determine a hand position of the driver on the steering wheel 801 at least at an instance of time. Accordingly, the processor may estimate the behavior of the driver as the driver holding the steering wheel 801 with the detected hand position the at least at the instance of time.

Furthermore, the processor may estimate the behavior by estimating a hand movement made by the driver on the steering wheel 801 based on the second sensor data related to at least a period of time indicating a change of the pressure information on the steering wheel 801. Accordingly, the processor may estimate the behavior of the driver as the driver moving the hand the steering wheel 801 with the estimated hand movement at the period of time. The processor may further determine a hand posture of the driver on the steering wheel 801 based on the second sensor data related to at least a period of time indicating a change of the pressure information on the steering wheel 801. Accordingly, the processor may estimate the behavior of the driver as the driver having the hand performing the estimated hand gesture at the period of time.

Furthermore, the processor may estimate the behavior of the driver by estimating an action of the driver based on the sensor data relating to a period of time. For example, the driver may increase the pressure applied by the hands, resulting in the pressure information in the sensor data changing by indicating that the pressure increased and decreased around the same location of the steering wheel 801, while the pressure is substantially the same for the rest of the locations of the steering wheel 801. Accordingly, the estimated action may indicate a squeeze action by the driver.

The driver may tap the steering wheel 801 a few times resulting the pressure information in the sensor data changing by indicating pulses of pressure at certain times on the steering wheel 801. Accordingly, the estimated action may indicate a tap action by the driver. The driver may rotate the hand 801 while still holding the steering wheel 801 resulting in the pressure information in the sensor data changing by indicating a rotational change of pressure around the axis of the steering wheel 801. Accordingly, the estimated action may indicate a rotating action by the driver.

Estimation of the behavior based on hands of the occupant, such as hand posture, location, movement, action captured from the use of hands and fingers may provide an indication about the identity of an individual. People may have unique styles while using the steering wheel 801 during driving, or while located in the vehicle. Hence the behavior of the occupant while driving or activating different settings via the use of different fingers and gestures in the vehicle may be specific to each individual person.

The above-mentioned behavior estimations are provided only for exemplary purposes. There may be further methods regarding estimating how the driver behaves and interacts with the vehicle based on the sensor data provided by the steering wheel. There may be further methods regarding estimating how the driver or another occupant behaves and interacts with the vehicle based on the sensor data provided by other types of sensors that are configured to provide a detection of interaction as discussed above.

Accordingly, the processor of the device 805 may determine a spoofing attempt result indicating whether the occupant attempts a spoofing based on the determined identity of the occupant and the estimated behavior of the occupant. The occupant information may include information indicating the behavior of the occupant in the vehicle, such as how an occupant interacts with the vehicle related to at least the identified occupant. The processor may determine the spoofing attempt result by checking whether the estimated behavior of the occupant relates to a previously stored behavior information for the determined identity of the occupant that the processor determines using the first sensor data.

For example, the occupant information may include behavior information indicating how occupants position their hands on the steering wheel 801 after or before an event, such as after they use one of the fingerprint sensors 802, 803, how occupants position their hands in general, which of the fingerprint sensors 802, 803 each occupant prefers, which finger occupants prefer to be scanned by the fingerprint sensor 802, 803, how much pressure occupants approximately apply to the steering wheel 801, how occupants hold the steering wheel 801. Furthermore, it may include how occupants interact with e.g. in-vehicle infotainment system, how occupants interact with vehicle functions, such as adjusting air conditioner or temperature of the vehicle, how occupants may react based on a predefined indication or warning, and such that may indicate how an occupant may behave to interact with the vehicle in response to the predefined indication or warning. The interactions may be stored in the occupant information with certain conditions indicating a condition for a defined interaction (e.g. the interaction may include the occupant holds the steering wheel at 9:15 position, and the related condition may indicate when the interaction is valid, such as after using a fingerprint sensor 802). Accordingly, the processor may check whether there is a match for the estimated behavior for the occupant identity determined using the first sensor data.

The processor may further be configured to determine a second identity based on the estimated behavior and the occupant information. The processor may access the occupant information to determine whether there is a match for the estimated behavior for at least one of the occupants provided in the occupant information. If the processor identifies that there is a match with an occupant, the processor may determine the second identity as the identity of that occupant. The processor may then determine the spoofing attempt result by checking whether the determined identity based on the first sensor data matches the second identity. In case they do not match, the processor may determine the spoofing attempt result indicating that the occupant attempts spoofing.

Figure 9:
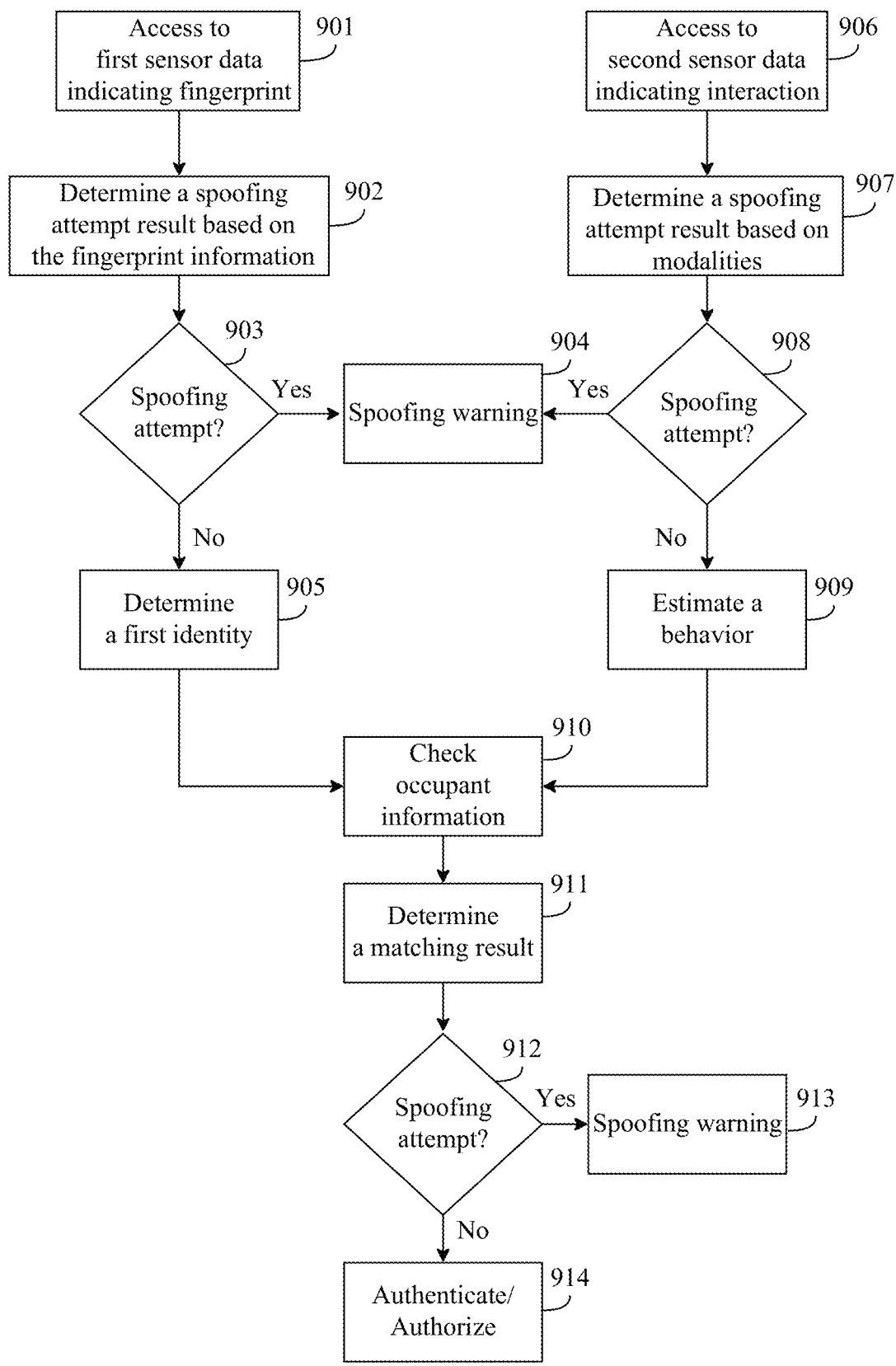
FIG. 9 shows schematically a flow diagram for an identification function.

FIG. 9 shows schematically a flow diagram for an identification function. As discussed herein, a device for identifying an occupant of a vehicle may perform the identification function. The device may access 901 to a first sensor data provided by a fingerprint sensor. The first sensor data may include fingerprint information scanned by the fingerprint sensor. The device may determine 902 a spoofing attempt result based on a processing of the fingerprint information via a neural network configured to detect fake and genuine fingerprints.

The device may check 903 whether the spoofing attempt result indicates that the occupant attempts a spoofing based on the fingerprint information. In case the spoofing attempt result indicates that the occupant attempts a spoofing, the device may provide a spoofing warning 904 using output devices of the device. In case the spoofing attempt result indicates that the occupant does not attempt a spoofing, the device may determine 905 a first identity for the occupant based on the first sensor data.

Furthermore, the device may access 906 to a second sensor data provided by other sensors (e.g. pressure sensor located in the steering wheel, motion sensors, etc.) indicating a detection of an interaction of the occupant with the vehicle. The second sensor data may include information indicating the detection of the interaction based on at least two modalities, such as pressure information and motion information. The device may determine 907 a spoofing attempt result based on a processing of the second sensor data for each of the modalities provided or based on a comparison of the respective modality information with each other.

The device may check 908 whether the spoofing attempt result indicates that the occupant attempts a spoofing based on the modality information of at least two modalities. In case the spoofing attempt result indicates that the occupant attempts a spoofing, the device may provide a spoofing warning 904 using output devices of the device. In case the spoofing attempt result indicates that the occupant does not attempt a spoofing, the device may estimate 909 a behavior for the occupant based on the second sensor data. The device may then access 910 to the occupant information to check whether the estimated behavior matches a behavior of the occupant of which the identity is determined in 905.

The device may determine 911 a spoofing attempt result based on a determined matching result according to the check of the determined first identity and the estimated behavior in the occupant information. In case the spoofing attempt result 912 indicates that the occupant attempts a spoofing, such as. the determined identity does not match the estimated behavior, the device may provide a spoofing warning 913 using output devices of the device. In case the spoofing attempt result indicates that the occupant does not attempt a spoofing, the device may authenticate or authorize 914 the occupant.

Figure 10:
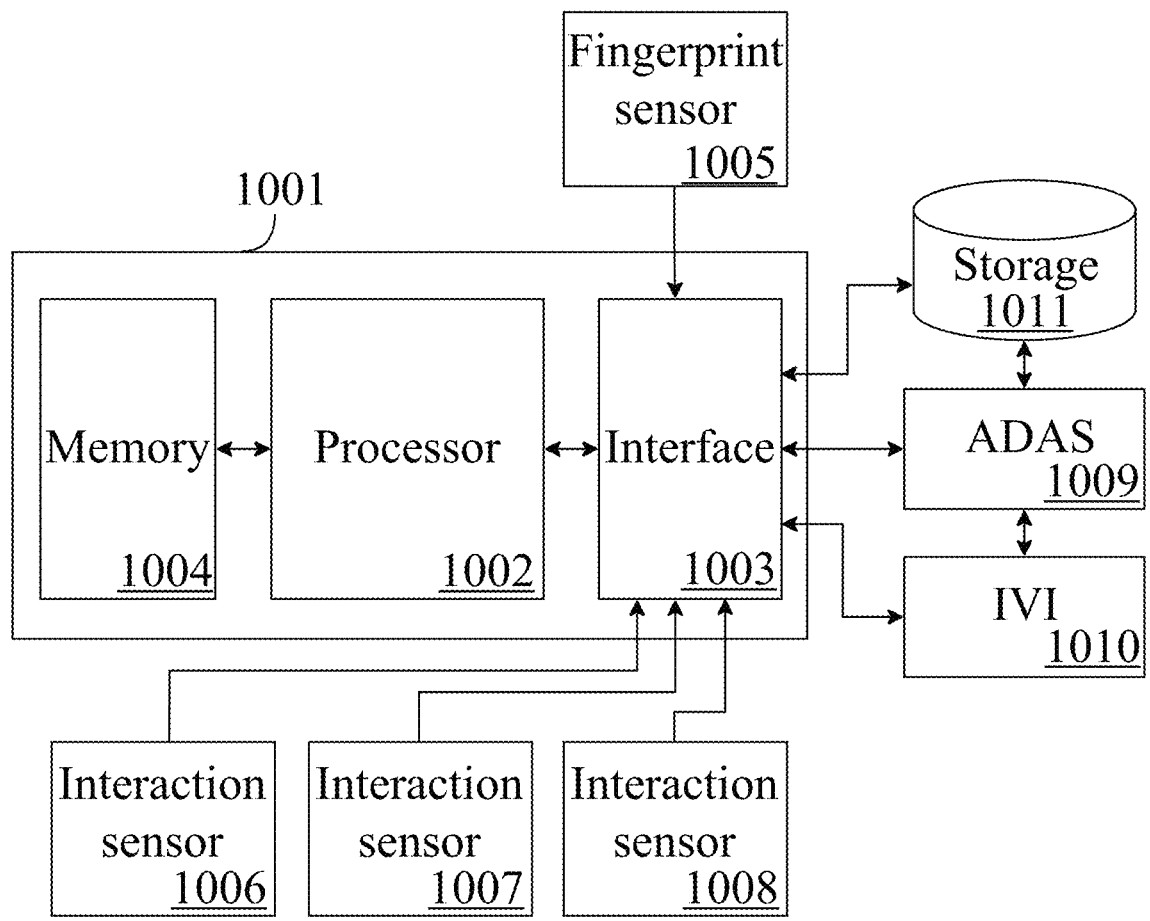
FIG. 10 shows schematically an example including a device for identifying an occupant of a vehicle.

FIG. 10 shows schematically an example including a device for identifying an occupant of a vehicle. A vehicle or an occupant/driver monitoring system may include the device 1001 with the input and output devices, and also other entities provided in this disclosure. The device 1001 may include a device as provided in this disclosure, such as the disclosure with respect to FIG. 8. The device 1001 may include a processor 1002, an interface 1003 to communicate information with other entities, and a memory 1004. The interface 1003 may be coupled to a fingerprint sensor 1005, and a plurality of interaction sensors 1006, 1007, 1008. An interaction sensor may be configured to detect an interaction of an occupant with the vehicle. As provided in this disclosure, a pressure sensor located in a steering wheel may be configured to detect an interaction of the driver with the vehicle, or a motion sensor may be configured to detect movements of an occupant when the occupant interacts with the vehicle, or a camera may detect an interaction of the occupant. The interface 1003 may further be coupled to an advanced driving assistance system (ADAS) 1009, an in-vehicle infotainment system (IVI) 1010, and a storage 1011.

The processor 1002 may be configured to receive the first sensor data via the interface 1003 from the fingerprint sensor 1005. The processor 1002 may further be configured to receive the second sensor data via the interface from the interaction sensors 1006, 1007, 1008. The processor 1002 may further be configured to receive the output of the interaction sensors 1006, 1007, 1008, and combine the output of the interaction sensors 1006, 1007, 1008 to obtain the second sensor data. the processor 1003 may combine the output of the interaction sensors using any combination methods, such as fusing. Accordingly, the second sensor data may include information relating an interaction of the occupant based on a plurality of modalities. One of the interaction sensors may also include a multimodal sensor that is configured to provide its output based on multiple modalities. The output of the multimodal sensor may include information indicating the detection of the multimodal sensor based on each of the modalities. Each of the sensors 1005, 1006, 1007, 1008 may provide information to the interface momentarily, at predefined intervals, or continuously.

Furthermore, at least one of the advanced driving assistance system (ADAS) 1009 and/or the in-vehicle infotainment system (IVI) 1010 may provide vehicle interaction information indicating the interactions performed on these entities. The processor 1002 may further combine the vehicle interaction information with the output of the interaction sensors 1006, 1007, 1008 to obtain the second sensor data. The processor 1002 may store the second sensor data in the memory 1004.

The vehicle interaction information may include a time information indicating the time of the interaction of the occupant with the advanced driving assistance system (ADAS) 1009 and/or the in-vehicle infotainment system (IVI) 1010. The processor 1002 may use the vehicle interaction information to identify and/or confirm the interactions detected by the interaction sensors 1006, 1007, 1008. For example, a camera may detect an interaction of an occupant with the vehicle when the occupant moves hands towards a button. The processor 1002 may confirm that the occupant had moved the hands to interact with the button by checking the vehicle information whether the button has been interacted with at or around that instance of time.

The processor 1002 may initiate an identification function as disclosed herein before the vehicle moves. Furthermore, the processor 1002 may further be configured to initiate a continuous spoofing detection function in order to detect potential spoofing attempts. The processor 1002 may continuously or within predefined or random intervals check whether a sensor data indicates a spoofing attempt performed by one of the occupants.

The processor 1002 may be configured to access the second sensor data indicating the interaction of the occupant with the vehicle using a hand for a period of time, such as plurality of images, or pressure information for the period of time, or motion information for the period of time provided by the interaction sensors 1006, 1007, 1008 in the vehicle. The processor 1002 may estimate a behavior for the occupant based on the second sensor data provided in this manner. The processor 1002 may determine a spoofing attempt result based on the second sensor data using the provided information based on time.

The processor 1002 may detect an action of the occupant. Furthermore, the memory 1004 of the device 1001 may include predefined spoofing behavior information indicating predefined features related to interaction with the vehicle using at least one hand that may be linked to a spoofing action. For example, the predefined spoofing behavior information may include reference information indicating how a hand of the driver behaves (applies pressure to the steering wheel/moves, etc.) when the driver holds a fake fingerprint to the fingerprint sensor 1005. The processor 1002 may determine the spoofing attempt result based on a comparison of the detected action of the occupant with the reference information. In case the comparison indicates that the detected action corresponds to the reference information, the processor 1002 may determine the spoofing attempt result indicating that the occupant attempts a spoofing by holding a fake fingerprint.

Furthermore, the processor 1002 may access the movement data of the vehicle. In this example, the advanced driving assistance system (ADAS) 1009 may provide the movement data to the interface 1003. The movement data may include information indicating a movement of the vehicle, in at least one instance of time, such as at least one kinematic force that the vehicle experiences at the at least one instance of time. The processor 1002 may detect the action of the occupant using the hand for a period of time, and the processor 1002 may determine whether the detected action of the occupant corresponds to the information indicating at least one kinematic force that the vehicle experiences at the at least one instance of time in which the at least one instance of time is within the period of time of the detected action.

For example, acceleration forces push the driver towards the back and deceleration towards the front due to inertia. Similarly, lateral movements following the curvature of the road or a lateral maneuver like a lane change or turn create similar lateral effects. The driver may increase the pressure applied by the hand to the steering wheel as a reaction. An interaction sensor may include the pressure sensor on the steering wheel. The processor 1002 may determine whether the detected action of the occupant corresponds to such effects. In case the processor 1002 determines that the detected action of the occupant does not correspond to effects that may be caused by the at least one kinematic force that the vehicle experience at the at least one instance of time, the processor 1002 may determine the spoofing attempt result indicating that the occupant attempts a spoofing due to incompatible detected action with the forces that the vehicle experience at the at least one instance of time-based on the movement data.

The interface 1003 may receive the movement data from the advanced driver-assistance system (ADAS) 1009 of the vehicle. The advanced driver-assistance system (ADAS) 1009 may provide the movement data including at least one kinematic force that the vehicle experiences. The advanced driver-assistance system (ADAS) 1009 may provide the movement data including information related to driving of the vehicle, such as a velocity, acceleration, estimated route, etc., that may indicate at least one kinematic force that the vehicle experiences and the processor 1002 may calculate at least one kinematic force that the vehicle experiences based on the movement data which the advanced driver-assistance system (ADAS) 1009 may provide.

Furthermore, the processor 1002 may estimate a first behavior for the occupant at a first period of time and a second behavior for the occupant at a second period of time-based on the interaction of the occupant using a hand. The processor 1002 may determine the spoofing attempt result based on the first behavior and the second behavior. The processor 1002 may determine the spoofing attempt result by comparing the first behavior and the second behavior. In case the comparison indicates that a change or a difference between the first behavior and the second behavior is above a predefined threshold, the processor 1002 may determine the spoofing attempt result indicating that the occupant attempts a spoofing due to the change of the estimated behavior.

For example, the processor 1002 may estimate the first behavior by estimating a first hand posture based on the second sensor data relating to a first period of time. The processor 1002 may further estimate the second behavior by estimating a second hand posture based on the second sensor data relating to a second period of time. The processor 1002 may compare the first hand posture and the second hand posture and obtain a spoofing attempt score indicating a difference and/or change of the hand posture of the occupant based on the first hand posture and the second hand posture. In case the difference and/or change of the hand posture, namely the spoofing attempt score is above a predefined threshold, the processor 1002 may determine the spoofing attempt result indicating that the occupant attempts a spoofing due to the change of the estimated behavior.

Furthermore, the processor 1002 may detect a first action of the occupant at a first period of time and a second action of the occupant at a second period of time. The processor 1002 may determine the spoofing attempt result based on the first action and the second action. The processor 1002 may determine the spoofing attempt result by comparing the first action and the second action to obtain a difference score. In case the comparison indicates that a change or a difference score between the first action and the second action is above a predefined threshold, the processor 1002 may determine the spoofing attempt result indicating that the occupant attempts a spoofing due to the change of the detected actions.

There may also be spoofing actions performed with a help of another occupant. Accordingly, the device 1001 may access to a third sensor data including information indicating an interaction of another occupant using a hand. The processor 1002 may extract the third sensor data from the second sensor data in a constellation, where the second sensor is further configured to detect interaction of another occupant. Alternatively, a third sensor may provide the information related to the third sensor data. The processor 1002 may be configured to perform the continuous spoofing detection function based on the third sensor data including information indicating an interaction of another occupant with the vehicle in order to determine a spoofing attempt result for the occupant in a similar manner disclosed herein.

Furthermore, the device 1001 may be configured to combine any of the spoofing attempt results disclosed herein that are determined in accordance with various aspects and determine whether the occupant attempts a spoofing based on the combination of a plurality spoofing attempt results. Each of the spoofing attempt results may include a score, or a probability indicating a probability of a spoofing attempt based on the corresponding determination. The combination of the spoofing attempt results may include assigning a predefined weight parameter for each of the spoofing attempt results.

Furthermore, the processor 1002 may generate a spoofing detection signal in case the processor 1002 determines that the occupant attempts a spoofing as disclosed herein. Based on the detection of spoofing, the advanced driver-assistance system (ADAS) 1009 and/or the in-vehicle infotainment system (IVI) 1010 may take necessary actions, such as disabling access to certain functions of the advanced driver-assistance system (ADAS) 1009 and/or the in-vehicle infotainment system (IVI) 1010, taking over the control of the vehicle by the advanced driver-assistance system (ADAS) 1009, initiating an emergency maneuver to stop the journey with the vehicle.

Furthermore, the processor 1002 may encode a message including an authentication request for the occupant based on the spoofing attempt result. The processor 1002 may generate a display information to be displayed on a display to request username and/or password, and/or a predefined secret question from the occupant as disclosed before. In response to a request from the occupant, the occupant may provide a response using a user interface. The interface 1003 may receive the response of the occupant and determine whether the response provided by the occupant in response to the request is correct. Accordingly, the processor 1002 may generate an authentication signal.

Furthermore, the processor 1002 may generate an authentication signal when no spoofing has been detected by the processor 1002 to be provided to the in-vehicle infotainment system (IVI) 1010 and/or the advanced driver-assistance system (ADAS) 1009. The processor 1002 may further generate an occupant identification signal for an occupant which the processor 1002 identifies using at least the identification function. The identification signal may include a unique identifier to indicate the identity of the occupant. The interface 1003 may provide the identification signal to the in-vehicle infotainment system (IVI) 1010 and/or the advanced driver-assistance system (ADAS) 1009, so that the in-vehicle infotainment system (IVI) 1010 and/or the advanced driver-assistance system (ADAS) 1009 may perform personalized actions, such as adjusting safety and/or comfort settings for the identified occupant according to predefined settings stored in the storage 1012. The comfort settings may include adjusting settings for providing the favorite music of the identified occupant, adjusting the seat of the identified occupant to predefined settings, adjusting the temperature of the interior of the vehicle to a predefined temperature for the occupant, etc. For example, the advanced driver-assistance system (ADAS) 1009 may determine the actions that the identified occupant is authorized for based on the identification signal. The in-vehicle infotainment system (IVI) 1010 may adjust at least one setting according to at least one predefined setting for the identified occupant that is provided in the storage 1012.

Furthermore, the processor 1002 may generate a control information indicating the estimated behavior or the detected interaction of the occupant with the vehicle using the hand. For example, the estimated behavior may include a hand movement that the processor 1002 detected using pressure information received from the pressure sensor located in the steering wheel. The control information may further include identity information indicating the identity of the identified occupant. The interface 1003 may provide the control information to the advanced driver-assistance system (ADAS) 1009 and/or the in-vehicle infotainment system (IVI) 1010 in order to adjust at least one setting of the advanced driver-assistance system (ADAS) 1009 and/or the in-vehicle infotainment system (IVI) 1010.

The storage 1012 may include behavior control information (e.g. a look-up table) indicating an adjustment of at least one setting based on an estimated behavior. The behavior control information may further include an identity information corresponding to the adjustment of the at least one setting the advanced driver-assistance system (ADAS) 1009 and/or the in-vehicle infotainment system (IVI) 1010 may access to the behavior control information in the storage and identify the adjustment of at least one setting based on the control information received from the interface 1003. Accordingly, the advanced driver-assistance system (ADAS) 1009 and/or the in-vehicle infotainment system (IVI) 1010 may adjust the corresponding setting based on the control information.

The driver may perform an interaction, such as a flick motion, a swipe motion, or a tap, or any type of interaction with a finger that the pressure sensor may detect. The processor 1002 may provide the control information indicating the estimated behavior of the driver indicating the performed interaction of the driver with the steering wheel to the advanced driver-assistance system (ADAS) 1009 and/or the in-vehicle infotainment system (IVI) 1010. The advanced driver-assistance system (ADAS) 1009 and/or the in-vehicle infotainment system (IVI) 1010 may identify at least one setting to be adjusted based on the control information received from the device 1001 and the behavior control information stored in the storage 1012. Accordingly, the advanced driver-assistance system (ADAS) 1009 and/or the in-vehicle infotainment system (IVI) 1010 may adjust the corresponding setting.

The processor 1002 may provide the control information indicating the estimated behavior of the driver with the identity information to the steering wheel to the advanced driver-assistance system (ADAS) 1009 and/or the in-vehicle infotainment system (IVI) 1010. The advanced driver-assistance system (ADAS) 1009 and/or the in-vehicle infotainment system (IVI) 1010 may identify at least one setting to be adjusted for the identified occupant based on the control information received from the device 1001 and the behavior control information stored in the storage 1012. Accordingly, the advanced driver-assistance system (ADAS) 1009 and/or the in-vehicle infotainment system (IVI) 1010 may adjust the corresponding setting. Accordingly, a personalized adjustment may also be performed.

Figure 12:
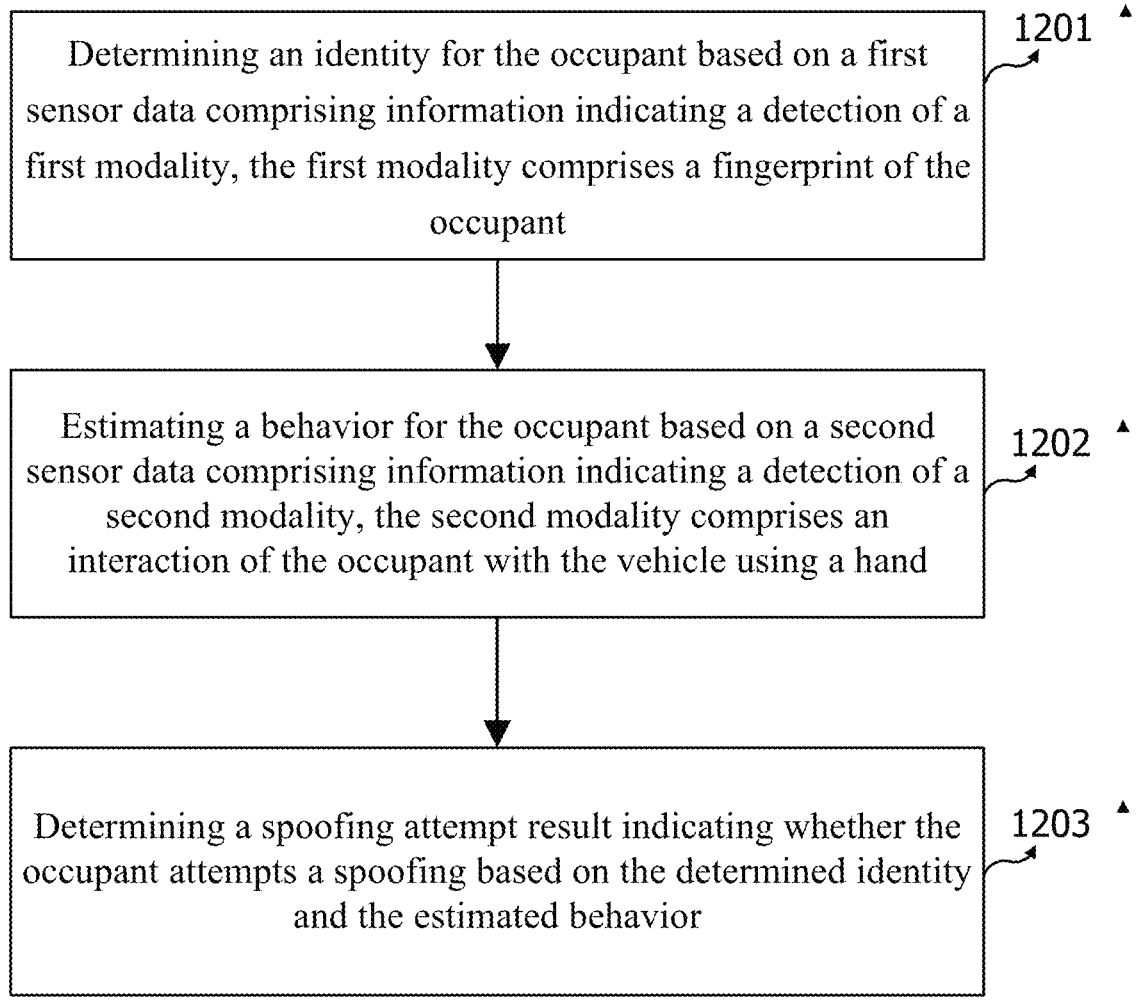
FIG. 12 shows schematically an example of a method.

FIG. 12 shows schematically an example of a method. The method may include determining 1201 an identity for the occupant based on a first sensor data including information indicating a detection of a first modality, the first modality includes a fingerprint of the occupant, estimating 1202 a behavior for the occupant based on a second sensor data including information indicating a detection of a second modality, the second modality includes an interaction of the occupant with the vehicle using a hand, and determining 1203 a spoofing attempt result indicating whether the occupant attempts a spoofing based on the determined identity and the estimated behavior. A non-transitory computer-readable medium including one or more instructions that when executed on a processor, cause the processor to perform the method.

It may be further desirable to assess whether the driver pays attention to monitor the driving functions of the vehicle. Especially with respect to different levels of automation regarding vehicles including advanced driving assistance systems, the attention of the driver may still be expected at various levels to monitor the vehicle and the environment of the vehicle. Accordingly, the vehicles may include various functions to detect whether the driver monitors the vehicle and the environment of the vehicle.

For example, the Society of Automotive Engineers (SAE) introduces various levels with respect to autonomous driving. According to level 2 automation, while the vehicle may perform steering, accelerating, and decelerating without the involvement of a driver, the vehicle may still need an intervention of the driver. A need for intervention from the driver may still be desired with respect to level 3 and level 4 automation as well. As the need for intervention from the driver declines, the driver may tend to be less alert, and the efforts provided by the driver to monitor the vehicle and the environment may decline. Accordingly, the alertness of the driver may need to be considered in order to determine whether the driver has at least a predefined alertness level as expected from the vehicle.

The driver may be expected to have a predefined alertness especially around the instances of time to switch at least one driving function between the vehicle and the driver. Vehicles may employ various functions to monitor the alertness of the driver, however as the drivers get familiar with what is expected from them to pass the threshold, the freshness of the tests performed by the monitoring system may also be important. It may be desirable to monitor the alertness of the driver by requesting certain interactions to be performed by the driver, which may not be easy to predict but performable while paying attention to the vehicle and the environment.

Figure 13:
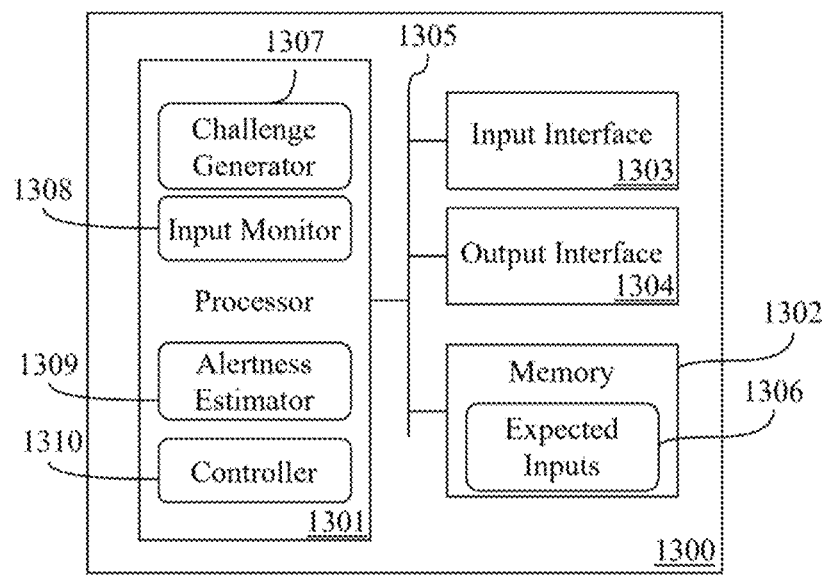
FIG. 13 shows schematically an example of a device for monitoring alertness of a driver.

FIG. 13 shows schematically an example of a device for monitoring the alertness of the driver. A vehicle or an occupant/driver monitoring system may include the device 1300 with the input and output devices, and also other entities provided in this disclosure. The device 1300 may include a processor 1301 and a memory 1302. The processor 1301 may be configured to select an excepted input randomly from a predefined plurality of expected inputs using expected input data in the memory 1302. The processor 1301 may generate an output indicating the selected expected input. The device 1300 may further include an input interface 1303 configured to receive input from other devices that the device 1300 is communicatively coupled to and an output interface 1304 configured to provide output to other devices that the device 1300 is communicatively coupled to. The processor 1301 may be coupled to the input interface 1303 and the output interface 1304 via an internal interface 1305 such as a bus.

The processor 1301 may provide the generated output to the output interface 1304, so that the output interface 1304 may provide the generated output to the output device to which the processor 1301 may determine to send the output. Furthermore, the processor 1301 may determine a determination result indicating whether the input interface 1303 has received an input in response to the generated output. The processor 1301 may determine whether the input received by the input interface 1303 relates to the selected expected output. Based on the determination result, the processor 1301 may estimate an alertness level of the driver.

The memory 1304 may be configured to store the expected input data 1306. The expected input data 1306 may include information indicating at least a plurality of expected inputs. The information indicating the plurality of expected inputs may include an interaction with the vehicle expected from the driver. An interaction may include the driver using a defined command input (e.g. buttons, keys, knobs, switches, arms, pressure, taps, friction, temperature). The interaction may further include a predefined way with respect to how the interaction is performed (pressing a button a predefined number of times, turning a knob clockwise, using the arm within a predefined period of time, etc.). The plurality of expected inputs may further include a predefined interaction type.

The plurality of expected inputs may further include a location of a predefined interaction. For example, the device 1300 may be coupled to a plurality of sensors (i.e. input devices) at various locations in the vehicle with the input interface 1303. Accordingly, the plurality of expected inputs may include locations for each of the sensors configured to detect an interaction. Similar to this context, the plurality of expected inputs may further include an indication from a predefined sensor, and/or a predefined detection region of a sensor. Furthermore, the plurality of expected inputs may include a predefined audio response expected from the driver.

Furthermore, the plurality of expected inputs may further include a movement and/or a gesture as a response from the driver. The movement and/or the gesture may further include generating a dynamic challenge which may refer to a plurality of expected inputs as well. For example, the occupant may provide an interaction based on a first indication related to a first expected input. In response to the detection of the interaction with a sensor, the processor 1301 may further generate a second indication with respect to a second expected input to receive a further interaction including a movement or a gesture starting from the interacted sensor with respect to the first expected input.

Accordingly, the expected input data 1306 stored in the memory 1302 may include any type of information indicating the plurality of expected inputs. The expected input data 1306 may include information related to identification of the expected inputs, i.e. reference information to determine whether an input is the expected input. The information related to the identification may vary according to the type of the interaction. For example, in case the expected input includes an audio response, the information related to the identification may include an audio file to be compared with the input. In case the expected input includes an interaction with a command input, the information related to identification may include an identifier for the predefined command input (e.g. signal to be provided from the button when the button is pressed, or an identifier to identify the corresponding signal stored in the memory 1302).

The information related to the identification of the expected input may include information indicating the type of the interaction, or a location of the interaction, or an indication to identify an input receiving device such as a sensor, an indication to identify a detection region of a sensor, an audio information indicating an expected audio input to be received or recorded, such as an audio file, a motion information indicating an expected motion/gesture to be received and recorded, such as a video file. The information related to the identification of the expected input may also include predefined metrics for the processor 1301 to perform calculations with respect to the received input to estimate an alertness level (e.g. an expected response time, maximum response time, a threshold to indicate a correlation with the received input, etc.). The information related to the identification of the expected input may also include an indication of an entity that is going to detect and/or receive the expected input (e.g. sensor, in-vehicle infotainment system, etc.)

Furthermore, the expected input data 1306 may include an output recipient information for each of the expected inputs. The output recipient information may include an indication with respect to a means to provide an indication of the expected input to the driver. The processor 1301 may access the output recipient information in order to identify an output device such as an excitation element, to provide an output based on the expected input. The output recipient information may include a plurality of output devices to provide a plurality of outputs for an expected input. The output recipient information may also vary according to the type of the expected input. The output recipient information may include a display output information to be displayed on a screen in the vehicle. The output recipient information may include an audio output information to be provided from an audio output. The output recipient information may include an identifier for an excitation element to be excited. The output recipient information may include a communication address (e.g. IP address) for the excitation element. The output recipient information may include any type of information that the processor 1301 may use to identify an output device to provide a generated output.

The processor 1301 may be configured to receive information via the internal interface 1305 from the input interface 1303 or send information via the internal interface 1305 to the output interface 1304. The device 1300 may include one interface (e.g. a communication interface) configured to provide communication with the input devices and output devices.

The input interface 1303 may include an interface configured to receive input including information from input devices such as image acquisition devices, proximity detectors, acoustic sensors, pressure sensors, fingerprint sensors, motion detectors, touch sensors, multimodal sensors, temperature sensors, light sensors, switches etc. Image acquisition devices may include cameras (e.g., multimodal cameras, standard cameras, digital cameras, video cameras, single-lens reflex cameras, infrared cameras, stereo cameras, depth cameras, RGB cameras, depth cameras, etc.), charge coupling devices (CCDs), or any type of image sensors, devices coupled to the vehicle such as advanced driver-assistance systems, electronic control unit, etc.

The input interface 1303 may be coupled to the input devices via any communication means. The input interface 1303 may be coupled to input devices electrically (e.g. via a wired connection) to receive data that the input devices may provide. The input interface 1303 may be communicatively coupled to the input devices (via wired or radio communication). The input interface 1303 may receive the first sensor data and the second sensor data over a communication network. Furthermore, the device 1300 may be communicatively coupled to other systems or devices of the vehicle (e.g. advanced driver-assistance systems, electronic control unit, etc.) via the input interface 1303. The input interface 1303 may be configured to receive driving-related information from other devices such as advanced driver-assistance systems, electronic control units, etc.

The device may further include one or more output devices to provide an output via the output interface 1304. The output devices may include any type of devices that the processor 1301 may determine to provide an indication to the driver based on the expected input. The output devices may include visual indicators such as light-emitting diodes (LEDs), lamps, heat generators, vibration generators, tactile feedback generators, protrusion generators, displays, loudspeakers, further systems or devices of the vehicle such as advanced driver-assistance systems, electronic control units, etc.

The output interface 1304 may be communicatively coupled to output devices. The output interface 1304 may be coupled to output devices via any communication means. The output interface 1304 may be coupled to output devices electrically (e.g. via a wired connection) to provide an output. The output interface 1304 may be communicatively coupled to output devices (via wired or radio communication). The output interface 1304 may provide an output to output devices. The output interface 1304 may provide the output over a communication network to the output devices.

The processor 1301 may include a challenge generating block 1307 configured to select an expected input randomly from a predefined plurality of expected inputs and generate an output indicating the expected input. The challenge generating block 1307 may generate a challenge for the driver in order to estimate an alertness level based on a response that the driver may provide in response to the generated challenge. The challenge generating block 1307 may be configured to access the expected input data 1306 in the memory 1302. The challenge generating block 1307 may be configured to select one of the expected inputs provided in the expected input data 1306 stored in the memory 1302 randomly.

The challenge generating block 1307 may be configured to select the expected input randomly according to any type of random selection method. As mentioned above, the expected input which the challenge generating block 1307 selects randomly may include an interaction, a location of a predefined interaction, a sensor to detect an interaction, a detection region of a sensor to detect an interaction, a type of interaction to be detected by a sensor, an audio response, a movement or a gesture.

The challenge generating block 1307 may access to driving-related information (e.g. traffic related information provided in this disclosure) indicating information related to the vehicle. The challenge generating block 1307 may be configured to select the expected input randomly from a subset or a superset of the plurality of expected inputs based on the driving-related information. Accordingly, the challenge generating block 1307 may be further configured to determine a subset or a superset of the plurality of expected inputs based on the driving-related information and the expected input data 1306 stored in the memory 1302 as a function of the context provided according to the driving-related information. Alternatively, the challenge generating block 1307 may disregard a selected expected input and perform another random selection based on the driving-related information.

For example, the driving-related information may provide trajectory information indicating a trajectory of the vehicle that the driver is driving. The trajectory information may include an indication that the vehicle is performing a turn, or will perform a turn in a predefined period of time according to its estimated route. Accordingly, the challenge generating block 1307 may exclude at least one of the plurality of expected inputs that may not be used with the indicated trajectory. The challenge generating block 1307 may exclude at least one of the plurality of expected inputs that may relate to the steering wheel of the vehicle (e.g. inputs to be received from a sensor on the steering wheel) while performing the selection. The challenge generating block 1307 may select an expected input randomly from a subset of the plurality of expected inputs which do not include expected inputs that may relate to the steering wheel of the vehicle. The challenge generating block 1307 may identify the expected inputs that may relate to the steering wheel of the vehicle according to the expected input data 1306.

The driving-related information may provide an indication that the expected input may not be detected due to various reasons. For example, the driving-related information may indicate that a temperature in the vicinity of an input device, and the challenge generating block 1307 may determine that the temperature is above a predefined threshold that the corresponding input device may need to operate in normal conditions. Accordingly, the challenge generating block 1307 may select an expected input randomly from a subset of the plurality of expected inputs which do not include expected inputs that may relate to the input device. The challenge generating block 1307 may identify the expected inputs that may relate to the corresponding input device according to the expected input data 1306.

The driving-related information may provide indication with respect to current limitations related to the driver such as the cabin temperature is low, or alternatively may provide an indication that the driver is wearing gloves. Accordingly, the challenge generating block 1307 may select an expected input randomly from a subset of the plurality of expected inputs which do not include expected inputs that may relate to an interaction of the driver using a hand. The challenge generating block 1307 may identify the expected inputs that may relate to the interaction of the driver using the hand according to the expected input data 1306.

The driving-related information may provide indication with respect to current visibility conditions of the interior of the vehicle such as the illumination of the cabin is above or below a predefined illumination level. Accordingly, the challenge generating block 1307 may select an expected input randomly from a subset of the plurality of expected inputs which do not include expected inputs that may be affected (e.g. LED lights when the illumination is above the threshold). The challenge generating block 1307 may identify the expected inputs that may be affected by illumination using the hand according to the expected input data 1306.

The driving-related information may provide indication with respect to an estimated distraction level of the driver. Accordingly, the challenge generating block 1307 may select an expected input randomly from a subset of the plurality of expected inputs based on the distraction level of the driver. The challenge generating block 1307 may identify the expected inputs that may be related to the estimated distraction level of the driver according to the expected input data 1306. The expected input data 1306 may include minimum or maximum distraction level information for the expected inputs.

The driving-related information may provide indication with respect to the location of the vehicle that the driver is driving. Accordingly, the challenge generating block 1307 may select an expected input randomly from a subset of the plurality of expected inputs based on the location of the vehicle. The challenge generating block 1307 may identify the expected inputs that may be affected by illumination using the hand according to the expected input data 1306.

The driving-related information may provide indication with respect to the location of a hand of the driver. Accordingly, the challenge generating block 1307 may select an expected input randomly from a subset of the plurality of expected inputs based on the location of the hand of the driver. For example, the challenge generating block 1307 may select an expected input randomly from a subset of the plurality of expected inputs that the driver may interact with in the vicinity of the hand of the driver. The challenge generating block 1307 may identify the expected inputs according to the expected input data 1306.

The driving-related information may provide indication with respect to traffic status in the environment of the vehicle. Accordingly, the challenge generating block 1307 may select an expected input randomly from a subset of the plurality of expected inputs based on the traffic status. For example, the expected input data 1306 may include information indicating a challenge level for the expected inputs to indicate an estimated challenge level to perform the expected input. The challenge generating block 1307 may select an expected input randomly from a subset of the plurality of expected inputs including only the expected inputs having an estimated challenge level below or above a predefined threshold based on the traffic status (e.g. when the traffic is dense, challenges having low challenge levels are selected).

Furthermore, the driving-related information may provide an indication to add at least one predefined expected input to the plurality of expected inputs, so that the challenge generation block 1307 may select an expected input from a superset of the plurality of expected inputs including the plurality of expected inputs and the at least one predefined expected input of which the driving-related information may provide the indication.

Furthermore, the challenge generating block 1307 may cancel the challenge generation based on the driving-related information. For example, the driving-related information may provide an indication of an unexpected traffic event (e.g. sudden vehicle cut-ins, pedestrian activity, etc.). The challenge generating block 1307 may cancel the challenge generation, or at least hold the challenge generation for a predefined period of time in order to avoid increasing the cognitive load on the driver.

Furthermore, the challenge generating block 1307 may perform the random selection of the expected input including a random selection from a subset or a superset of the plurality of expected inputs based on the driving-related information. For example, the driving-related information may provide an indication that the driver is detected as distracted or the driving-related information may provide an indication that the vehicle may enter to, or be located in, a residential area or a school zone. Accordingly, the indication may trigger the challenge generating block 1307 to generate a challenge, by selecting an expected input. Similarly, the input monitoring block 1308 may also trigger the challenge generating block 1307 to generate a challenge by selecting an expected input.

Furthermore, the challenge generating block 1307 may perform the random selection of the expected input including a random selection from a subset or a superset of the plurality of expected inputs based on the driving-related information. For example, the driving-related information may provide an indication that the driver is detected as distracted or the driving-related information may provide an indication that the vehicle may enter to, or be located in, a residential area or a school zone. Accordingly, the indication may trigger the challenge generating block 1307 to generate a challenge, by selecting an expected input. Similarly, the input monitoring block 1308 may also trigger the challenge generating block 1307 to generate a challenge by selecting an expected input.

Furthermore, the challenge generating block 1307 may receive an indication from the input monitoring block 1308, and the challenge generating block 1307 may select an expected input randomly from a subset of the plurality of expected inputs based on the indication that the input monitoring block 1308 provides. For example, the input monitoring block 1308 may provide an indication that an input has been received from a sensor. Accordingly, the challenge generating block 1307 may select an expected input randomly from a subset of the plurality of expected inputs including only the expected inputs related to the corresponding sensor.

The challenge generating block 1307 may further be configured to select more than one expected inputs randomly. Accordingly, the challenge generating block 1307 may be configured to generate more than one output in order to indicate the more than one selected expected inputs to the driver at the same time, or at different instances of time such that a second generated output for a second selected expected input is indicated to the driver temporally after indication of a first generated output for a first selected expected input.

The challenge generating block 1307 may further be configured to select a second expected input after a selected first expected input based on the selected first expected input. The challenge generating block 1307 may be configured to select the second expected input randomly from a subset or a superset of the plurality of expected inputs based on the selected first expected input. Accordingly, the challenge generating block 1307 may be further configured to determine a subset or a superset of the plurality of expected inputs based on the selected first expected input and the expected input data 1306 stored in the memory 1302 as a function of the first selection.

For example, the challenge generating block 1307 may select an expected input randomly from a subset of a plurality of expected inputs which only include the same type of interactions of the selected first expected input in order to estimate the alertness of the driver using the same type of interactions. The subset of the plurality of expected inputs may only include expected inputs that are in a predefined vicinity of the location of the interaction of the selected first expected input. The subset of the plurality of expected inputs may include other expected inputs defined for the selected sensor for the selected first expected input. The challenge generating block 1307 may determine the expected inputs to include/exclude for the subset according to the expected input data 1306.

The expected input data 1306 may further include a level information indicating various levels of the expected inputs for a plurality of expected inputs. Accordingly, the challenge generating block 1307 may select a first expected input from a subset of a plurality of expected inputs of a first level, and the challenge generating block 1307 may select a second expected input from a subset of a plurality of expected inputs of a second level. Any type of methods disclosed with respect to subset selection may be combined in this disclosure.

With respect to any examples relating to a selection from a subset or a superset of a plurality of expected inputs, the challenge generating block 1307 may be configured to generate a list including indications for each of the expected inputs that are intended to be in the subset or the superset and select an expected input randomly from the generated list. Alternatively, the challenge generating block 1307 may instruct the memory 1302 to remove and/or add expected inputs temporarily or permanently to the expected input data 1306 in order to obtain the subset or superset for the plurality of expected inputs.

Based on the selected expected input, the challenge generating block 1307 may generate the output in order to indicate the selected expected input to the driver. The challenge generating block 1307 may generate the output in a manner that the recipient of the output may provide an indication to the driver to indicate the selected expected input. The challenge generating block 1307 may determine an excitation element based on the selected expected input, for which the challenge generating block is configured to generate the output. The challenge generating block 1307 may select an excitation element based on the expected input data 1306. The challenge generating block 1307 may determine a recipient for the generated output.

The challenge generating block 1307 may use the information which the expected input data 1306 provides in order to determine a recipient output device as the excitation element which the generated output will be provided. The output may include an information accessed via the expected input data 1306 for the selected expected input. The output may include an indication of the selected interaction and/or the location of the selected interaction, and/or selected sensor to detect the selected expected input, and/or selected detection region of a sensor to detect the selected expected input and/or type of the selected interaction, and/or the output recipient information.

Furthermore, the challenge generating block 1307 may generate the output based on the selected expected input, and the output may include a first output to be provided to a first excitation element and a second output to be provided to a second excitation element. For example, the challenge generating block 1307 may generate the first output to be provided to an excitation element in the steering wheel to indicate the expected input to be received by a sensor (e.g. pressure sensor) located in the vicinity of the excitation element. Furthermore, the challenge generating block 1307 may generate the second output to be provided to a display of the vehicle to indicate the driver that the driver should provide interaction at (or in the vicinity of) the indicated location. The challenge generating block 1307 may generate the second output to be provided to an audio output of the vehicle to indicate to the driver that the driver should provide interaction three times (e.g. at intervals) on the indicated location. Accordingly, the challenge generating block 1307 may be configured to indicate the expected input via different excitation elements.

Accordingly, the processor 1301 may provide the generated output to the output interface 1304, and the output interface 1304 may send the output to its recipient output device based on the selected expected input. Furthermore, the challenge generating block 1307 may provide an indication to an input monitoring block 1308 to indicate that an output is generated for the selected expected input.

The processor 1301 may further include the input monitoring block 1308. The input monitoring block 1308 may be configured to monitor an input to be received by the input interface 1303 from an input device in response to the output which the challenge generating block 1307 generates. Furthermore, the input monitoring block 1308 may determine a determination result indicating whether an input received from the input interface 1303 in response to the generated output for the expected input selected by the challenge generating block 1307 relates to the selected expected input.

The input monitoring block 1308 may determine an input to be monitored based on the expected input data 1306 stored in the memory 1302. The input monitoring block 1308 may access to the expected input data 1306 to identify a sender of the expected input. Accordingly, based on the identification of the sender of the expected input, the input monitoring block 1308 may monitor signals provided by the identified sender.

Furthermore, a signal received by the input interface 1303 may include an indication that a sender has sent the signal in response to the generated output which the output interface 1304 has sent. The indication may include information encoded in the signal (e.g. header) indicating that the signal is sent in response to the generated output. Furthermore, a signal which the input interface 1303 receives may include information indicating the sender of the signal, and the input monitoring block 1308 may determine whether the sender has sent the signal in response to the output. The input monitoring block 1308 may access the expected input data to determine whether the sender has sent the signal in response to the output generated based on the selected expected input.

The input monitoring block 1308 may determine the determination result indicating whether an input received from the input interface 1303 relates to the expected input based on the information related to identification of the expected input which the expected input data 1306 includes. The input monitoring block 1308 may analyze each of the inputs received by the input interface 1303 to determine whether each of the inputs relates to the expected input according to the reference information with respect to the selected expected input.

For example, the input interface 1303 may be coupled to input devices that are configured to provide a detection information (e.g. sensor data) indicating an interaction of the driver with the vehicle. The input devices may include any type of components or devices that may detect an interaction of the occupant. In case the selected expected input includes an interaction, the input monitoring block 1308 may analyze inputs received from the input interface 1303 to determine whether the interaction of the selected expected input relates to the inputs indicating a detection of an interaction received from the input interface 1303 based on the reference information that the expected input data 1306 provides.

The input interface 1303 may be coupled to input devices that are configured to provide a detection information (e.g. sensor data) indicating an interaction of the driver with the vehicle. In case the selected expected input includes a location of the interaction, the input monitoring block 1308 may analyze inputs received from the input interface 1303 to determine whether the location of the interaction of the selected expected input relates to a location of an interaction indicated by inputs received from the input interface 1303 based on the expected input data 1306.

Furthermore, the input monitoring block 1308 may determine whether the interaction indicated by the received input is provided by a sensor that is located in a predefined vicinity of the location of the interaction of the selected expected input. For example, the memory 1302 may further include locations of sensors that are configured to provide the detection information. The input monitoring block 1308 may determine the determination result based on the location of the sensor stored in the memory 1302 for the sensor that provides the detection information.

Furthermore, the input interface 1303 may be coupled to various sensors. In case the selected expected input includes a detection of a defined sensor for an interaction, the input monitoring block 1308 may analyze inputs received from the input interface 1303 to determine whether there is a detection performed by the defined sensor based on the expected input data 1306. In case the selected expected input includes a detection by a defined detection region of a sensor, the input monitoring block 1308 may analyze inputs received from the input interface 1303 to determine whether there is a detection performed by the defined detection region of the sensor based on the expected input data 1306. In case the selected expected input includes a type of interaction, the input monitoring block 1308 may analyze inputs received from the input interface 1303 to determine whether there is a detection of interaction with respect to the type of interaction based on the expected input data 1306.

Furthermore, the input interface 1303 may be coupled to a microphone, or to an in-vehicle infotainment system of the vehicle to receive a recorded audio. In case the selected expected input includes an audio response, the input monitoring block 1308 may analyze inputs received from the input interface 1303 to determine whether there is an audio response received by the input interface 1303 matching the reference audio response provided by the expected input data 1306. The input monitoring block 1308 may perform various methods to extract and compare the recorded audio with a reference audio response which the expected input data 1306 provides.

Furthermore, the input interface 1303 may be coupled to a motion sensor, a camera, or a monitoring system to monitor the driver to receive information indicating a movement and/or a gesture of the driver. In case the selected expected input includes a movement or a gesture of the driver, the input monitoring block 1308 may analyze inputs received from the input interface 1303 to determine whether there is a movement or a gesture received by the input interface 1303. The input monitoring block 1308 may perform various methods to extract or estimate the movement and/or gesture that the driver performs and compare the extracted or estimated movement and/or gesture with the reference movement or gesture provided by the expected input data 1306.

The input monitoring block 1308 may be configured to compare inputs received by the input interface 1303 and a reference input based on the expected input data 1306 to determine the determination result. The input monitoring block 1308 may be configured to select the reference information which the expected input data 1306 provides for the selected expected input to use as a reference input. The input monitoring block 1308 may generate a reference input based on the reference information which the expected input data 1306 provides for the selected expected input. The input monitoring block 1308 may compare the reference input and inputs received by the input interface 1303 in response to the output to determine the determination result.

Furthermore, the input monitoring block 1308 may determine the determination result by calculating a matching score based on the comparison of the reference input and inputs received by the input interface 1303. The matching score may indicate the similarity between a received input with the reference input (i.e. how much the received input resembles the reference input). It may be desirable to calculate a matching score especially in cases where no exact match is expected (e.g. audio response, gesture response), and the input monitoring block 1308 may determine the determination result based on the calculated matching score and a predefined threshold for the selected expect input. The expected input data 1306 may include a threshold information for the corresponding expected input.

The input monitoring block 1308 may provide an indication of the determination result to an alertness estimator 1309. The input monitoring block 1308 may provide an indication indicating that the input monitoring block 1308 has not received any input relating to the selected expected input in case the input monitoring block 1308 does not determine that an input received by the input interface 1303 relating to the selected expected input for a predefined first period of time. The input monitoring block 1308 may be configured to monitor the inputs received by the input interface 1303 to determine the determination result for a predefined second period of time. The expected input data 1306 may include information indicating the predefined first period of time and the predefined second period of time for each of the plurality of expected inputs.

Furthermore, the input monitoring block 1308 may generate a time information indicating an instance of time which the input interface 1303 received the input that relates to the selected expected input to the alertness estimator 1309. Alternatively, the received input may include a time information indicating an instance of time-related to the generation of the input or the corresponding detection. The alertness estimator 1309 may access the time information.

The processor 1301 may further include an alertness estimator 1309 configured to estimate an alertness level of the driver based on the determination result. The alertness estimator 1309 may further estimate the alertness level of the driver based on the matching score. The alertness estimator 1309 may further estimate the alertness level of the driver based on the time information related to the time of the input. The alertness estimator 1309 may further estimate the alertness level of the driver based on the predefined metrics stored in the expected input data 1306 for the selected expected input.

Accordingly, the alertness estimator 1309 may send an indication to the challenge generating block 1307 to generate another challenge based on the estimated alertness level.

The alertness estimator 1309 may also provide an indication of the estimated alertness level to the challenge generating block 1307, so that the challenge generating block 1307 may use the indication for the determination of subsets/supersets with respect to the plurality of expected inputs to perform the random selection. The alertness estimator 1309 may provide an alertness output indicating the estimated alertness level for another device (e.g. advanced driving assistance system, electronic control unit, etc.).

The processor 1301 may further include a controller 1310 configured to provide coordination between the processing blocks of the processor 1301, and also between the processor 1301 and other components or modules of the device 1300.

Figure 14:
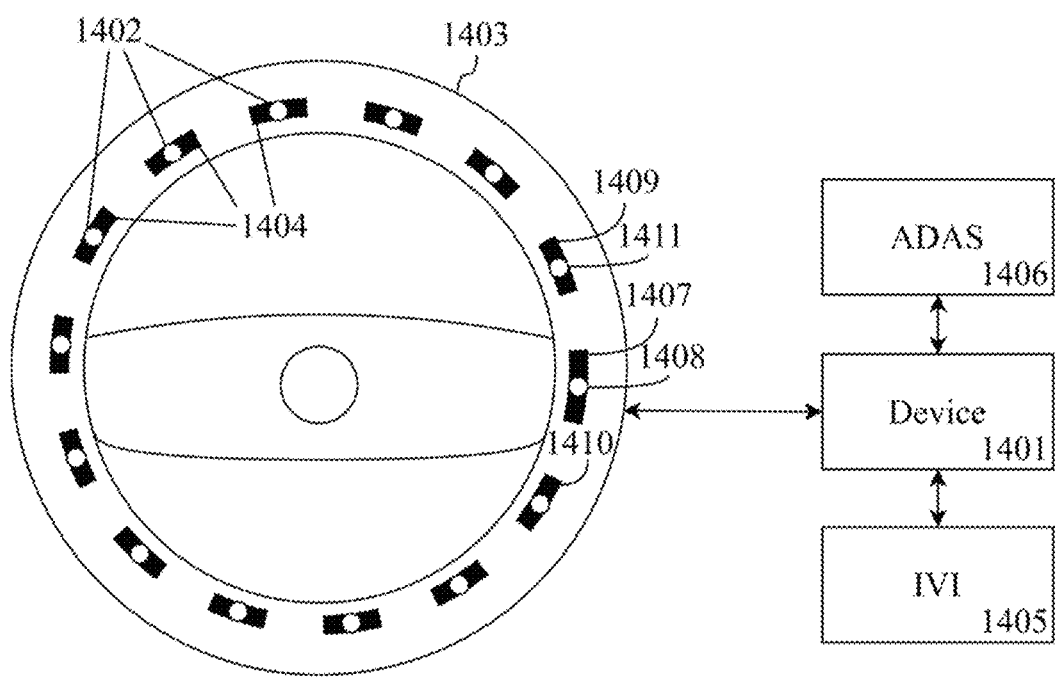
FIG. 14 shows an illustration including a device for estimating an alertness level of a driver.

FIG. 14 shows an illustration including a device for estimating an alertness level of a driver. The device 1401 may include the device for estimating an alertness level of a driver as provided according to FIG. 13. The device 1401 may be coupled to a plurality of excitation elements 1402 provided on a steering wheel 1403 of a vehicle. The steering wheel 1403 may also include a plurality of pressure sensors 1404 configured to detect an interaction of the driver with the steering wheel 1403 of the vehicle. The plurality of pressure sensors 1404 and the plurality of excitation elements 1402 are configured such that each of the excitation elements 1402 may provide an indication to the driver about a selected pressure sensor 1404. Each of the pressure sensors 1404 may be located in the vicinity of one of the excitation elements 1402.

The device may further be communicatively coupled to an in-vehicle infotainment system 1405 of the vehicle and the advanced driving assistance system 1406 of the vehicle to communicate with these devices.

The excitation elements 1402 may include any component that may provide a detectable indication to the driver. The excitation elements may include a visual indicator to provide a visual indication to the driver (e.g. a light-emitting diode), or a heat generator (e.g. resistor) to provide an indication via heat, or a vibration generator to provide an indication by vibration, or a protrusion generator to provide an indication via haptic feedback. In this example, the excitation elements 1402 may include light-emitting diodes.

The expected input data in a memory of the device 1401 may include an identifier for each of the 14 pressure sensors 1404. The expected input data may further include an identifier for the excitation element 1402 which each of the pressure sensors 1404 are provided in the vicinity of. Furthermore, the expected input data may include a threshold information as information related to the identification of the expected input. The expected input data may further include information indicating a type of the interaction.

The device 1401 may receive information from the advanced driving assistance system 1406 of the vehicle and initiate an alertness estimation function based on the received information. Accordingly, a processor of the device 1401 may select an expected input from the expected input data randomly. The selected expected input from the expected input data may indicate that the expected input should include a pressure sensor detection signal from a selected pressure sensor 1407. The selected expected input may further include for the selected pressure sensor 1407 that the interaction type should include a tapping interaction. The selected expected input may further include that there should be two taps within a predefined period of time. The selected expected input may further include that each of the taps should apply a minimum amount of pressure defined with a predefined threshold.

Based on the selected expected input, the processor may determine to generate a first output signal to excite the excitation element 1408 in the proximity of the selected pressure sensor 1407. Furthermore, the processor may generate a second output signal to provide an indication to the driver via the in-vehicle infotainment system 1405. Accordingly, the processor may generate the second output signal as a compliment indication to the driver by encoding an audible signal including two beeps to indicate to the driver that two tapping interaction is expected. The output interface of the device 1401 may provide the first output signal to the selected excitation element and the second output signal to the in-vehicle infotainment system 1405.

The processor of the device 1401 may monitor input sensor data that the input interface receives from the selected pressure sensor 1407. The processor may analyze the input sensor data received from the selected pressure sensor 1407 to identify two interactions (e.g. taps) from the input sensor data after the device has sent the output signals. The processor may detect the interactions two times from the input sensor data based on a detection of a pressure reading above the predefined threshold within the predefined period of time as provided with the expected input data for the selected expected input. Accordingly, the processor may determine a determination result indicating whether the input sensor data relates to the selected expected input based on the detection.

The processor may further estimate an alertness level for the driver based on the determination result and the reaction time of the driver to the provided indication. In this example, the processor determines that a further challenge for the driver is needed. Accordingly, the processor may select a second expected input randomly. This time, the processor may decide to select a second expected input and a third expected input randomly from a subset of the plurality of expected inputs, in order to provide a challenge to the driver in a predefined proximity of the selected expected input of the previous challenge.

Accordingly, the processor may generate a subset of the plurality of expected inputs from the plurality of expected inputs. The subset of the plurality of expected inputs may include only expected inputs that may be received by two neighboring pressure sensors of the previously selected pressure sensor 1407, and the previously selected pressure sensor 1407. Accordingly, the subset of the plurality of expected inputs may include only expected inputs that may be received by a first neighboring pressure sensor 1409, a second neighboring pressure sensor 1410, and the previously selected pressure sensor 1407. The processor may select the second expected input and the third expected input from the generated subset of the plurality of expected inputs.

The second expected input may indicate that the expected input should include a pressure sensor detection signal from the first neighboring pressure sensor 1409. The selected expected input may further include for the selected pressure sensor 1409 that the interaction type should include a torsion interaction. The selected expected input may further include the torsion interaction that should be provided within a predefined period of time. The selected expected input may further include that the torsion interaction should apply a minimum amount of pressure defined with a predefined threshold.

The third expected input may indicate that the expected input should include a detection of pressure starting from the first neighboring pressure sensor 1409 and moving towards the previously selected pressure sensor 1407 in a dynamic manner. The third expected input may further include for the movement a predefined period of time to perform the movement.

Based on the second expected input, the processor may determine to generate a first output signal to excite the excitation element 1411 in the proximity of the first neighboring pressure sensor 1409. Furthermore, the processor may generate a second output signal to provide an indication to the driver via the in-vehicle infotainment system 1405. Accordingly, the processor may generate the second output signal as a compliment indication to the driver by encoding a display information including a text to be displayed on the display of the in-vehicle infotainment system 1405 to indicate to the driver that a torsion interaction is expected. The output interface of the device 1401 may provide the first output signal to the excitation element 1411 and the second output signal to the in-vehicle infotainment system 1405 at a first instance of time.

Based on the third expected input, the processor may determine to generate a third output signal to excite the excitation element 1408 in the proximity of the previously selected pressure sensor 1407 at a second instance of time. Furthermore, the processor may generate a fourth output signal to provide an indication to the driver via the in-vehicle infotainment system 1405 that the driver should move his hand towards the previously selected pressure sensor 1407 at the second instance of time. Accordingly, the processor may generate the fourth output signal as a compliment indication to the driver by encoding a display information including a text to be shown on the display of the in-vehicle infotainment system 1405 to indicate to the driver that a torsion interaction is expected.

The processor may determine the second instance of time based on completion of the first challenge (i.e. receiving an input that relates to the second expected input). The processor may determine the second instance of time based on expected input data including information indicating a time of the interaction. The processor may determine the second instance of time based on a predefined period of time starting from the first instance of time. Accordingly, the output interface of the device 1401 may provide the third output signal to the excitation element 1408 and the fourth output signal to the in-vehicle infotainment system 1405 at the second instance of time.

The processor of the device 1401 may monitor input sensor data that the input interface receives from the first neighboring pressure sensor 1409. The processor may analyze the input sensor data received from the first neighboring pressure sensor 1409 to identify a torsion interaction from the input sensor data after the device 1401 has sent the first and second output signals. The processor may detect the torsion interaction from the input sensor data based on a detection of a pressure reading above the predefined threshold, and the direction of the pressure is changing with time within the predefined period of time as provided with the expected input data for the selected expected input.

The processor of the device 1401 may monitor input sensor data that the input interface receives from the previously selected pressure sensor 1407 after the second instance of time, or the processor of the device 1401 may monitor the previously selected pressure sensor 1407 after the processor detects the torsion interaction for the second expected input. The processor may analyze the input sensor data received from the first neighboring pressure sensor 1409 and the previously selected sensor 1407 simultaneously to identify a movement of applied pressure from the first neighboring pressure sensor 1409 towards the previously selected sensor 1407. Accordingly, the processor may determine a determination result.

The processor may further estimate an alertness level for the driver based on the determination result and the reaction time of the driver to the provided indications. In this example, the processor determines that a further challenge for the driver is needed. Accordingly, the processor may select a fourth expected input randomly. This time, the processor may decide to select a fourth expected input randomly from a second set of the plurality of expected inputs, in order to provide a different type of challenge to the driver. Accordingly, the processor may generate a second set of the plurality of expected inputs from expected inputs which relate to interaction of the driver with the in-vehicle infotainment system 1405 stored in the memory.

The processor may further generate a subset of the second set of the plurality of expected inputs based on the input sensor data received from the plurality of pressure sensors 1404. For example, the processor may determine that the hand of the driver is still located on the selected pressure sensor 1409 based on the input sensor data received from the pressure sensor 1409. Accordingly, the processor may generate the subset of the second set of the plurality of expected inputs based on their location of the interaction with the in-vehicle infotainment system 1405 stored in the expected input data for the second set of the plurality of expected inputs. Accordingly, the generated subset may include only interactions of the driver with the in-vehicle infotainment system 1405 in a predefined proximity of the selected pressure sensor 1409 and select the fourth expected input randomly from the generated subset.

The fourth expected input may indicate that the expected input should include an interaction with a volume button coupled to the in-vehicle infotainment system. The selected expected input may further include that the volume button should be pressed two times. Based on the second expected input, the processor may determine to generate an output signal to provide an indication to the in-vehicle infotainment system 1405. The output signal may include a display information including a text to be displayed on the display of the in-vehicle infotainment system 1405 to indicate to the driver that the driver should press the defined volume button two times. Furthermore, the output signal may indicate the selected expected input to the in-vehicle infotainment system 1405, so that the in-vehicle infotainment system 1405 may provide a response that may indicate if the volume button has been pressed two times, or alternatively, the in-vehicle infotainment system 1405 may forward to signals received from the volume button to the device 1401.

The processor of the device 1401 may monitor input data that the input interface receives from the in-vehicle infotainment system 1405. Based on a response provided from the in-vehicle infotainment system 1405, the processor may determine a determination result indicating whether the response received from the in-vehicle infotainment system 1405 relates to the fourth expected input based. Accordingly, the device 1401 may estimate an alertness level for the driver. The disclosure especially regarding FIG. 14 has been provided on an exemplary basis, and it is clear to the skilled person that further examples may be provided based on the disclosure. In particular, any type of sensors that are configured to detect an interaction, expected inputs or excitation elements provided in this disclosure may be used in a similar manner.

Figure 15:
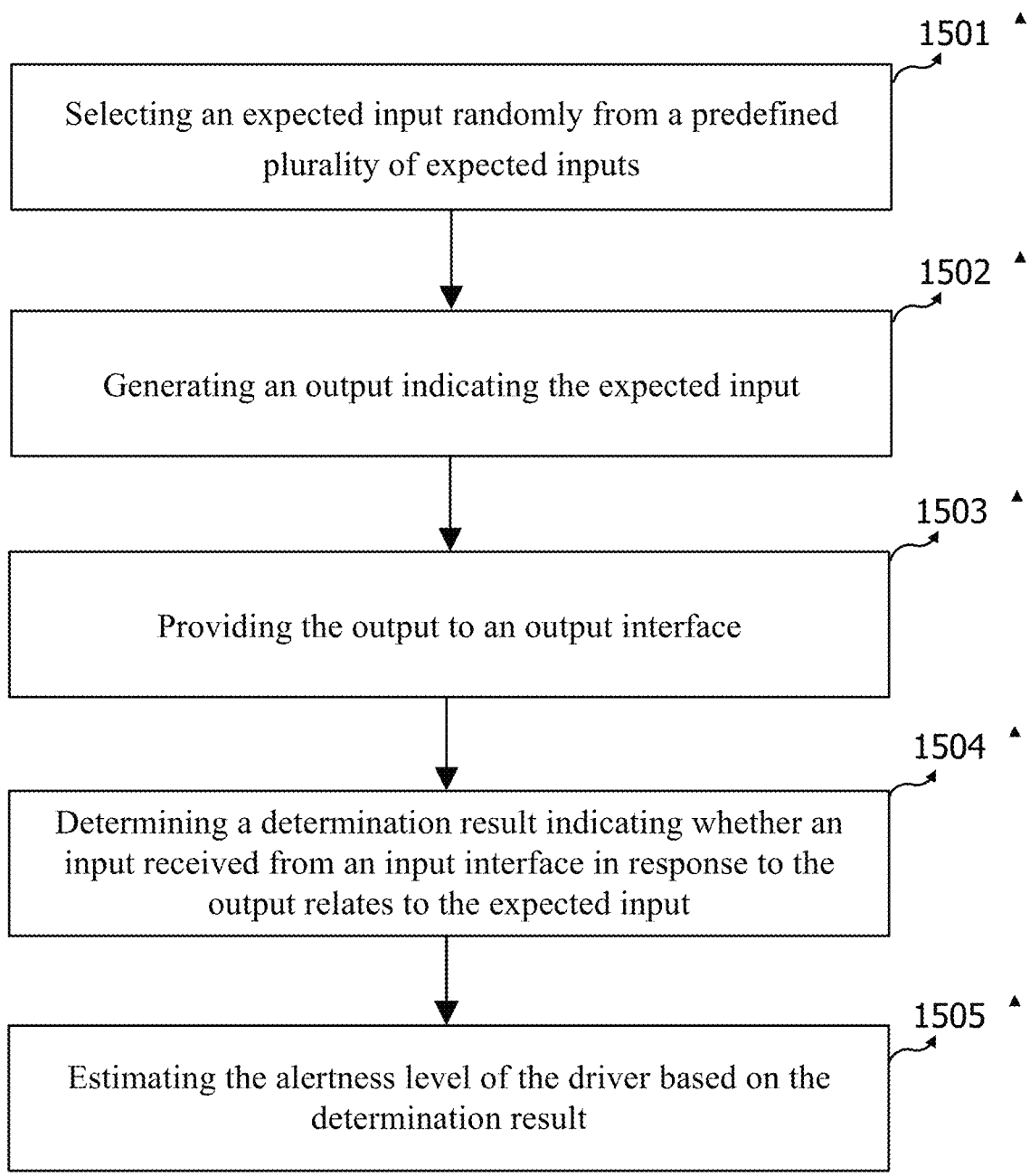
FIG. 15 shows schematically an example of a method.

FIG. 15 shows schematically an example of a method. The method may include selecting 1501 an expected input randomly from a predefined plurality of expected inputs, generating 1502 an output indicating the expected input, providing 1503 the output to an output interface, determining 1504 a determination result indicating whether an input received from an input interface in response to the output relates to the expected input, and estimating 1505 the alertness level of the driver based on the determination result. A non-transitory computer-readable medium including one or more instructions that when executed on a processor, cause the processor to perform the method.

The following examples pertain to further aspects of this disclosure.

Example 1A includes a device for identifying an occupant of a vehicle. The subject matter may include: a processor configured to: determine an identity for the occupant based on a first sensor data may include information indicating a detection of a facial attribute of the occupant, estimate a behavior for the occupant based on a second sensor data may include information indicating a detection of a body attribute of the occupant, determine a spoofing attempt result indicating whether the occupant attempts a spoofing based on the determined identity and the estimated behavior.

In example 2A, the subject matter of example 1A, can optionally include that the first sensor data includes a first modality information indicating the detection of the facial attribute of the occupant based on a first modality and a second modality information indicating the detection of the facial attribute of the occupant based on a second modality; and can optionally include that the processor is further configured to determine the spoofing attempt result based on the first modality information and the second modality information.

In example 3A, the subject matter of example 1A or example 2A, can optionally include that the second sensor data includes a first modality information indicating the detection of the body attribute of the occupant based on a first modality and a second modality information indicating the detection of the body attribute of the occupant based on a second modality. In example 4A, the subject matter of example 2A or example 3A, can optionally include that the first modality information includes a near-infrared (NIR) image of the occupant, and the second modality information includes a depth image of the occupant.

In example 5A, the subject matter of any one of examples 2A to 4A, can optionally include that the processor is further configured to generate a first spoofing attempt score based on the first modality information, generate a second spoofing attempt score based on the second modality information, combining the first spoofing attempt score and the second spoofing attempt score to determine the spoofing attempt result. In example 6A, the subject matter of example 5A, can optionally include that the processor is further configured to generate a spoofing attempt score for the first sensor data and/or the second sensor data and based on a convolutional neural network model.

In example 7A, the subject matter of example 6A, can optionally include that processor is further configured to generate the first spoofing attempt score by applying a first convolutional neural network model to the first modality information, and, can optionally include that the processor is further configured to generate the second spoofing attempt score by applying a second convolutional neural network model to the second modality information. In example 8A, the subject matter example 7A, further may include a memory configured to store first model parameters to apply the first convolutional neural network model and/or second model parameters to apply the second convolutional neural network model. In example 9A, the subject matter of example 8A, can optionally include that the processor is configured to adjust the first model parameters based on the first spoofing attempt score, and/or adjust the second model parameters based on the second spoofing attempt score.

In example 10A, the subject matter of example 8 or example 9, can optionally include that the processor is further configured to adjust the first model parameters and/or the second model parameters based on the spoofing attempt result. In example 11A, the subject matter of any one of examples 1A to 10A, can optionally include that the processor is further configured to generate a spoofing attempt warning based on the spoofing attempt result. In example 12A, the subject matter of any one of examples 1A to 11A, can optionally include that the processor is further configured to determine the identity for the occupant based on the first sensor data according to an occupant information in a memory. In example 13A, the subject matter of example 12A, can optionally include that the processor is further configured to determine the identity based on the first sensor data and the occupant information may include one or more occupant facial attributes in the memory.

In example 14A, the subject matter of any one of examples 1A to 13A, can optionally include that the first sensor data includes information indicating the detection of the facial attribute of the occupant in a plurality of time instances. In example 15A, the subject matter of any one of examples 1A to 14A, can optionally include that the processor is further configured to estimate the behavior for the occupant by estimating a body posture of the occupant. In example 16A, the subject matter of any one of examples 1A to 15A, can optionally include that the second sensor data includes information indicating the detection of the body attribute of the occupant for a period of time, and can optionally include that the processor is configured to detect an action of the occupant spatiotemporally. In example 17A, the subject matter of example 16A can optionally include that the processor is configured to estimate the behavior of the occupant based on the detected action of the occupant.

In example 18A, the subject matter of example 17A, can optionally include that the processor is further configured compare the detected action of the occupant and a predefined spoofing action in a memory, and can optionally include that the processor is configured to determine the spoofing attempt result based on the comparison of the detected action with the predefined spoofing action. In example 19A, the subject matter of example 17A or 18A, can optionally include that the detected action includes a first action based on the second sensor data may include information indicating the detection of the occupant for a first period of time, can optionally include that the processor is configured to detect a second action based on the second sensor data may include information indicating a detection of the occupant for a second period of time.

In example 20A, the subject matter of example 19A, can optionally include that the processor is configured to determine the spoofing attempt result based on the first action and the second action, can optionally include that the processor is configured to compare the first action with the second action to obtain a difference score to determine the spoofing attempt result. In example 21A, the subject matter of example 20A, can optionally include that the processor is configured to determine that the detected action includes a spoofing action in case the difference score indicates a change over a predetermined threshold.

In example 22A, the subject matter of any one of examples 16A to 21A, can optionally include that the processor is further configured to determine the spoofing attempt result based on a movement information indicating the movement of the vehicle on at least one time instance and the detected action. In example 23A, the subject matter of example 22A, can optionally include that the movement information includes information indicating kinematic forces that the vehicle experiences. In example 24A, the subject matter of any one of examples 16A to 23A, can optionally include that the processor is further configured to determine the spoofing attempt result based on a third sensor data may include information indicating detection of an attribute of a further occupant located in the vehicle.

In example 25A, the subject matter of example 24A, can optionally include that the processor is further configured to detect a further occupant action for the further occupant based on the third sensor data, and can optionally include that the processor is further configured to determine the spoofing attempt result based on the detected further occupant action. In example 26A, the subject matter of example 24A or example 25A, can optionally include that the occupant information includes information indicating behavior of a plurality of occupants, can optionally include that the attribute of the further occupant includes a behavior of the further occupant.

In example 27A, the subject matter of any one of examples 1A to 26A, can optionally include that the determined identity includes a first identity, and can optionally include that the processor is further configured to determine a second identity for the occupant based on the estimated behavior for the occupant according to the occupant information in the memory. In example 28A, the subject matter of example 27A, can optionally include that the second sensor data includes at least one image of at least a portion of the body of the occupant, and can optionally include that the occupant information includes information indicating a predefined behavior for the occupant. In example 29A, the subject matter of example 27A or example 28A, can optionally include that the processor is further configured to estimate the second identity by comparing the estimated behavior of the occupant and the occupant information may include a plurality of behaviors for a plurality of occupants.

In example 30A, the subject matter of any one of examples 27A to 29A, can optionally include that the processor is further configured to determine a matching result indicating whether the first identity matches the second identity. In example 31A, the subject matter of example 30A, can optionally include that the processor is further configured to determine the spoofing attempt result based on the matching result. In example 32A, the subject matter of example 31A, can optionally include that the processor is further configured to authenticate or not authenticate the occupant based on the matching result.

In example 33A, the subject matter of any one of examples 12A to 32A, can optionally include that the occupant information further includes at least one setting for an authenticated occupant, and can optionally include that the processor is further configured to send information indicating the at least one setting for the authenticated occupant. In example 34A, the subject matter of example 33A, can optionally include that the processor is further configured to adjust a setting of the vehicle based on the at least one setting for the authenticated occupant. In example 35A, the subject matter of any one of examples 1A to 34A, can optionally include that the processor is further configured to determine an alertness score of the occupant based on at least one of the first sensor data and/or the second sensor data. In example 36A, the subject matter of any one of examples 1A to 35A, can optionally include that the processor is further configured to encode a message to be transmitted based on the spoofing attempt result.

In example 37A, the subject matter of any one of examples 1A to 36A, can optionally include that the processor is further configured to provide an authentication request for the occupant based on the spoofing attempt result. In example 38A, the subject matter of example 37A, can optionally include that the authentication request includes generating display information to be displayed to the occupant, can optionally include that the display information includes information indicating an entry for a username and/or password for the occupant. In example 39A, the subject matter of example 38A, can optionally include that the authentication request includes generating display information to be displayed to the occupant, can optionally include that the display information includes information indicating a predetermined question for the occupant. In example 40A, the subject matter of example 39A, can optionally include that the processor is further configured to receive an authentication response from the occupant, can optionally include that the authentication response includes at least one of a text information received from the occupant, or an audio input of the occupant, or a visual input of the occupant.

In example 41A, the subject matter of any one of examples 1A to 40A, can optionally include that the behavior includes at least one of the following: a body posture, an action performed by the occupant, an interaction of the occupant with the vehicle. In example 42A, the subject matter of any one of examples 1A to 41A, further may include: an interface configured to receive sensor data may include the first sensor data and the second sensor data. In example 43A, the subject matter of example 42A, can optionally include that the interface is configured to receive the sensor data from one or more sensors located in the vehicle. In example 44A, the subject matter of example 43A, can optionally include that the one or more sensors include: a facial camera configured to capture at least one facial attribute of the occupant, a side camera configured to capture at least a portion of the body of the occupant, a pressure sensor configured to detect a pressure applied by at least the portion of the body of the occupant, a motion sensor configured to detect a movement of at least a portion of the body of the occupant. In example 45A, the subject matter of example 44A, can optionally include that at least one of the facial camera and the side camera is configured to capture a near infra-red image and a depth image.

In example 46A, the subject matter includes a driving monitoring system for a vehicle may include: a device for identifying an occupant of a vehicle according to any one of examples 1A to 45A, an interface configured to receive data from one or more sensors and provide the sensor data to the processor of the device, the one or more sensors include at least one of: a facial camera configured to capture at least one facial attribute of the occupant, a side camera configured to capture at least a portion of the body of the occupant, a pressure sensor located in a seat of the vehicle configured to detect a pressure applied by at least the portion of the body of the occupant, a pressure sensor located in a driving wheel of the vehicle configured to detect a pressure applied by at least the portion of the body of the occupant.

In example 47A, the subject matter includes a vehicle may include the device monitoring system of example 46A, further may include at least one of: the facial camera configured to capture at least one facial attribute of the occupant, the side camera configured to capture at least a portion of the body of the occupant, the seat may include the pressure sensor configured to detect a pressure applied by at least the portion of the body of the occupant.

In example 48A, the subject matter includes a non-transitory computer-readable medium including one or more instructions that when executed on a processor, cause the processor to perform as provided in any one of examples 1A to 48A.

Example 1B includes a subject matter of a subject matter for identifying an occupant of a vehicle, the subject matter may include: a processor configured to: determine an identity for the occupant based on a first sensor data may include information indicating a detection of a first modality, the first modality includes a fingerprint of the occupant, estimate a behavior for the occupant based on a second sensor data may include information indicating a detection of a second modality, the second modality includes an interaction of the occupant with the vehicle using a hand, determine a spoofing attempt result indicating whether the occupant attempts a spoofing based on the determined identity and the estimated behavior.

In example 2B, the subject matter of example 1B, can optionally include that the second sensor data includes a first modality information indicating the detection of the interaction of the occupant based on a first modality and a second modality information indicating the detection of interaction of the occupant based on a second modality; and can optionally include that the processor is further configured to determine the spoofing attempt result based on the first modality information and the second modality information. In example 3B, the subject matter of example 2B, can optionally include that the first modality information includes information indicating a position of the hand of the occupant, and the second modality information includes information indicating a gesture of the hand of the occupant.

In example 4B, the subject matter of example 2B or example 3B, can optionally include that the processor is further configured to generate a first spoofing attempt score based on the first modality information, generate a second spoofing attempt score based on the second modality information, combining the first spoofing attempt score and the second spoofing attempt score to determine the spoofing attempt result. In example 5B, the subject matter of example 4B, can optionally include that the processor is further configured to generate a spoofing attempt score for the first sensor data and/or the second sensor data and based on a convolutional neural network model. In example 6B, the subject matter of example 5B, can optionally include that processor is further configured to generate the first spoofing attempt score by applying a first convolutional neural network model to the first modality information, and, can optionally include that the processor is further configured to generate the second spoofing attempt score by applying a second convolutional neural network model to the second modality information.

In example 7B, the subject matter example 6B, further may include a memory configured to store first model parameters to apply the first convolutional neural network model and/or second model parameters to apply the second convolutional neural network model. In example 8B, the subject matter of example 7B, can optionally include that the processor is configured to adjust the first model parameters based on the first spoofing attempt score, and/or adjust the second model parameters based on the second spoofing attempt score. In example 9B, the subject matter of example 8B, can optionally include that the processor is further configured to adjust the first model parameters and/or the second model parameters based on the spoofing attempt result. In example 10B, the subject matter of any one of examples 1 to 9, can optionally include that the processor is further configured to generate a spoofing attempt warning based on the spoofing attempt result.

In example 11B, the subject matter of any one of examples 1B to 10B, can optionally include that the processor is further configured to determine the identity for the occupant based on the first sensor data according to an occupant information in a memory. In example 12B, the subject matter of example 11B, can optionally include that the processor is further configured to determine the identity based on the first sensor data and the occupant information may include one or more occupant fingerprints in the memory. In example 13B, the subject matter of any one of examples 1B to 12B, can optionally include that the processor is further configured to estimate the behavior for the occupant by determining at least one of the following based on the second sensor data: a hand position of the occupant, a hand movement made by the occupant, a hand posture of the occupant, an action of the occupant.

In example 14B, the subject matter of any one of examples 1 to 13B, can optionally include that the second sensor data includes information indicating the detection of the interaction of the occupant with the vehicle for a period of time, and can optionally include that the processor is configured to detect an action of the occupant based on the second sensor data for the period of time. In example 15B, the subject matter of example 14B, can optionally include that the processor is configured to estimate the behavior of the occupant based on the detected action of the occupant. In example 16B, the subject matter of example 15B, can optionally include that the processor is further configured compare the detected action of the occupant and a predefined spoofing action stored in a memory, and can optionally include that the processor is configured to determine the spoofing attempt result based on the comparison of the detected action with the predefined spoofing action.

In example 17B, the subject matter of example 16B, can optionally include that the processor is configured to determine the spoofing attempt result indicating that the occupant attempts to spoofing in case the detected action relates to the predefined spoofing action. In example 18B, the subject matter of any one of examples 14B to 17B, can optionally include that the detected action includes a first action based on the second sensor data may include information indicating the detection of the interaction of the occupant with the vehicle for a first period of time, can optionally include that the processor is configured to detect a second action based on the second sensor data may include information indicating a detection of the interaction of the occupant with the vehicle for a second period of time. In example 19B, the subject matter of example 18B, can optionally include that the processor is configured to determine the spoofing attempt result based on the first action and the second action.

In example 20B, the subject matter of example 19B, can optionally include that the processor is configured to compare the first action with the second action to obtain a difference score to determine the spoofing attempt result. In example 21B, the subject matter of example 20B, can optionally include that the processor is configured to determine that the detected action includes a spoofing action in case the difference score indicates a change over a predetermined threshold. In example 22B, the subject matter of any one of examples 16B to 21B, can optionally include that the processor is further configured to determine the spoofing attempt result based on a movement information indicating the movement of the vehicle on at least one time instance and the detected action. In example 23B, the subject matter of example 22B, can optionally include that the movement information includes information indicating kinematic forces that the vehicle experiences.

In example 24B, the subject matter of any one of examples 16B to 23B, can optionally include that the processor is further configured to determine the spoofing attempt result based on a third sensor data may include information indicating detection of an attribute of a further occupant located in the vehicle. In example 25B, the subject matter of example 24B, can optionally include that the processor is further configured to detect a further occupant action for the further occupant based on the third sensor data, and can optionally include that the processor is further configured to determine the spoofing attempt result based on the detected further occupant action. In example 26B, the subject matter of example 25B, can optionally include that the processor is further configured compare the detected further occupant action of the occupant and a predefined spoofing action stored in a memory, and can optionally include that the processor is configured to determine the spoofing attempt result based on the comparison of the detected further occupant action with the predefined spoofing action.

In example 27B, the subject matter of example 26B, can optionally include that the processor is configured to determine the spoofing attempt result indicating that the occupant attempts to spoofing in case the detected further occupant action relates to the predefined spoofing action. In example 28B, the subject matter of any one of examples 24B to 27B, can optionally include that the occupant information includes information indicating behavior of a plurality of occupants, can optionally include that the attribute of the further occupant includes a behavior of the further occupant. In example 29B, the subject matter of any one of examples 1 to 28B, can optionally include that the determined identity includes a first identity, and can optionally include that the processor is further configured to determine a second identity for the occupant based on the estimated behavior for the occupant according to the occupant information in the memory.

In example 30B, the subject matter of example 29B, can optionally include that the occupant information includes information indicating a predefined behavior for the occupant. In example 31B, the subject matter of example 29B or example 30B, can optionally include that the processor is further configured to estimate the second identity by comparing the estimated behavior of the occupant and the occupant information may include a plurality of behaviors for a plurality of occupants. In example 32B, the subject matter of any one of examples 29B to 31B, can optionally include that the processor is further configured to determine a matching result indicating whether the first identity matches the second identity. In example 33B, the subject matter of example 32B, can optionally include that the processor is further configured to determine the spoofing attempt result based on the matching result.

In example 34B, the subject matter of example 33B, can optionally include that the processor is further configured to authenticate or not authenticate the occupant based on the matching result. In example 35B, the subject matter of any one of examples 11B to 34B, can optionally include that the occupant information further includes at least one setting for an authenticated occupant, and can optionally include that the processor is further configured to send information indicating the at least one setting for the authenticated occupant. In example 36B, the subject matter of example 35B, can optionally include that the processor is further configured to adjust a setting of the vehicle based on the at least one setting for the authenticated occupant.

In example 37B, the subject matter of example 36B, can optionally include that the processor is further configured to adjust the setting of the vehicle based on the first sensor data and/or the second sensor data. In example 38B, the subject matter of example 37B, can optionally include that the processor is further configured to detect a finger of the occupant based on the first sensor data, and can optionally include that the processor is further configured to adjust the setting of the vehicle based on the detected finger of the occupant.

In example 39B, the subject matter of example 38B, can optionally include that the processor is further configured to adjust the setting of the vehicle based on the estimated behavior of the occupant. In example 40B, the subject matter of any one of examples 1B to 39B, can optionally include that the processor is further configured to determine an alertness score of the occupant based on at least one of the first sensor data and/or the second sensor data. In example 41B, the subject matter of any one of examples 1B to 40B, can optionally include that the processor is further configured to encode a message to be transmitted based on the spoofing attempt result. In example 42B, the subject matter of any one of examples 1B to 41B, can optionally include that the processor is further configured to provide an authentication request for the occupant based on the spoofing attempt result. In example 43B, the subject matter of example 42B, can optionally include that the authentication request includes generating display information to be displayed to the occupant, can optionally include that the display information includes information indicating an entry for a username and/or password for the occupant.

In example 44B, the subject matter of example 43B, can optionally include that the authentication request includes generating display information to be displayed to the occupant, can optionally include that the display information includes information indicating a predetermined question for the occupant. In example 45B, the subject matter of example 44B, can optionally include that the processor is further configured to receive an authentication response from the occupant, can optionally include that the authentication response includes at least one of a text information received from the occupant, or an audio input of the occupant, or a visual input of the occupant.

In example 46B, the subject matter of any one of examples 1B to 45B, can optionally include that the behavior includes at least one of the following: a hand position of the occupant, a hand movement made by the occupant, a hand posture of the occupant, an action performed by the occupant, an interaction of the occupant with the vehicle. In example 47B, the subject matter of any one of examples 1B to 46B, further may include: an interface configured to receive sensor data may include the first sensor data and the second sensor data. In example 48B, the subject matter of example 47B, can optionally include that the interface is configured to receive the sensor data from one or more sensors located in the vehicle. In example 49B, the subject matter of example 48B, can optionally include that the one or more sensors include: a fingerprint sensor configured to capture at least one fingerprint of the occupant, a pressure sensor configured to detect a pressure applied by the hand of the occupant, a motion sensor configured to detect a movement of the hand of the occupant.

In example 50B, a driving monitoring system for a vehicle may include: a device for identifying an occupant of a vehicle according to any one of examples 1B to 49B, an interface configured to receive data from one or more sensors and provide the sensor data to the processor of the subject matter, the one or more sensors include at least one of: a fingerprint sensor configured to capture at least one fingerprint of the occupant, a pressure sensor located in a driving wheel of the vehicle configured to detect a pressure applied by the hand of the occupant, a motion sensor located in the vicinity of the driving wheel configured to detect a movement of the hand of the occupant.

In example 51B, the driving monitoring system of example 50B, can optionally include that the interface is further configured to receive data may include information indicating the interaction of the occupant with the vehicle. In example 52B, a vehicle may include the subject matter monitoring system of example 50B or 51B, further may include at least one of: the fingerprint sensor configured to capture at least one fingerprint of the occupant, the driving wheel may include the pressure sensor configured to detect the pressure applied by the hand of the occupant, the motion sensor located in the vicinity of the driving wheel configured to detect a movement of the hand of the occupant, and a processor configured to generate the data may include information indicating the interaction of the occupant with the vehicle.

In example 53B, the subject matter includes a non-transitory computer-readable medium including instructions that when executed on a processor, cause the processor to perform as provided in any one of examples 1B-52B.

Example 1C includes a subject matter of a device for estimating an alertness level of a driver. The subject matter may include: a processor configured to: select an expected input randomly from a predefined plurality of expected inputs, generate an output indicating the expected input, provide the output to an output interface, determine a determination result indicating whether an input received from an input interface in response to the output relates to the expected input estimate the alertness level of the driver based on the determination result.

In example 2C, the subject matter of example 1C, can optionally include that the processor is configured to select the expected input from the predefined plurality of expected inputs by selecting at least one of the following: an interaction, and/or a location of an interaction, and/or an indication from a sensor and/or a detection region of the sensor, and/or an interaction type, and/or an audio response, and/or a movement/gesture response. In example 3C, the subject matter of example 2C, can optionally include that the plurality of expected inputs includes at least one of the following: a plurality of interactions, and/or a plurality of locations of an interaction, and/or a plurality of indication from one or more sensors and/or a plurality of detection regions of a sensor, and/or a plurality of interaction types, and/or a plurality of audio responses, and/or a plurality of movement/gesture responses.

In example 4C, the subject matter of example 3C, can optionally include that the processor is further configured to select the expected input by selecting an interaction, can optionally include that the input received from the input interface includes information indicating a detected interaction, can optionally include that the processor is further configured to determine the determination result by comparing the selected interaction to the detected interaction. In example 5C, the subject matter of example 3C, can optionally include that the processor is further configured to select the expected input by selecting the location of the interaction, can optionally include that the input received from the input interface includes information indicating a location of a received interaction. In example 6C, the subject matter of example 5C, can optionally include that the processor is further configured to determine whether the input received from the input interface relates to the expected input by determining whether the selected location of the interaction relates to the location of the received interaction.

In example 7C, the subject matter of example 5C or example 6C, can optionally include that the processor is further configured to select the location of the interaction for the expected input by selecting a sensor to detect the interaction, can optionally include that the input received from the input interface includes sensor data may include information indicating the sensor that detected the received interaction. In example 8C, the subject matter of example 7C, can optionally include that the processor is further configured to determine whether the input received from the input interface relates to the expected input by determining whether the selected sensor relates to the sensor that detected the received interaction indicated by the sensor data. In example 9C, the subject matter of any one of examples 5C to 8C, can optionally include that the processor is further configured to select the location of the interaction for the expected input by selecting a detection region for a sensor to detect the interaction, can optionally include that the input received from the input interface includes sensor data may include information indicating the detection region for of a received interaction.

In example 10C, the subject matter of example 9C, can optionally include that the processor is further configured to determine whether the input received from the input interface relates to the expected input by determining whether the selected detection region for the sensor relates to the detection region indicated by the sensor data. In example 11C, the subject matter of any one of examples 3C to 10C, can optionally include that the processor is further configured to select the expected input by determining the interaction type may include at least one of a pressure, or a tap, or a torsion, can optionally include that the input received from the input interface includes sensor data may include information indicating at least one of a detected pressure, or a detected tap, or a detected torsion.

In example 12C, the subject matter of example 11C, can optionally include that the processor is further configured to determine whether the input received from the input interface relates to the expected input by comparing the at least one of the pressure, or the tap, or the torsion to the information indicating at least one of the detected pressure, or the detected tap, or the detected torsion of the sensor data respectively. In example 13C, the subject matter of any one of examples 3C to 12C, can optionally include that the processor is further configured to select the expected input by selecting the audio response, can optionally include that the input received from the input interface includes information indicating a received audio response. In example 14C, the subject matter of example 13C, can optionally include that the processor is further configured to determine whether the input received from the input interface relates to the expected input by determining whether the selected audio response relates to the received audio response.

In example 15C, the subject matter of any one of examples 3C to 14C, can optionally include that the processor is further configured to select the expected input by selecting the gesture, can optionally include that the input received from the input interface includes information indicating a received gesture. In example 16C, the subject matter of example 15C, can optionally include that the processor is further configured to determine whether the input received from the input interface relates to the expected input by determining whether the selected gesture relates to the received gesture.

In example 17C, the subject matter of any one of examples 3C to 16C can optionally include that the output is configured to indicate the expected input by may include information related to the expected input indicating at least one of the following: the interaction, and/or the location of the interaction, and/or the sensor and/or the detection region of the sensor, and/or the interaction type, and/or the audio request, and/or the movement/gesture request.

In example 18C, the subject matter of any one of examples 1C to 17C, can optionally include that the processor is further configured to generate the output by generating an audio signal to indicate the expected input, can optionally include that the audio signal includes an audible indication to indicate the expected input. In example 19C, the subject matter of any one of examples 1C to 18C, can optionally include that the processor is further configured to determine an excitation element based on the expected input, can optionally include that the output includes information indicating the excitation element. In example 20C, the subject matter of example 19C, can optionally include that the processor is further configured to determine the excitation element by selecting the excitation element from a plurality of excitation elements based on the expected input.

In example 21C, the subject matter of example 19C or 20C, further may include a plurality of excitation elements coupled to the output interface, can optionally include that the output interface is configured to provide an output signal to the determined excitation element. In example 22C, the subject matter of any one of examples 19C to 21C, can optionally include that the excitation element includes at least one of the following: a visual indicator, and/or a heat generator, and/or a vibration generator, and/or a protrusion generator, and/or a display, and/or a speaker. In example 23C, the subject matter of any one of examples 1C to 22C, can optionally include that the input interface is configured to receive the sensor data from at least one sensor.

In example 24C, the subject matter of any one of examples 1C to 23C, further may include a plurality of sensors coupled to the input interface, can optionally include that the input interface is configured to receive an input signal from a plurality of sensors. In example 25C, the subject matter of any one of examples 1C to 24C, can optionally include that the processor is further configured to determine a target sensor based on the expected input, can optionally include that the output includes information indicating the target sensor. In example 26C, the subject matter of example 25C, can optionally include that the processor is further configured to determine the target sensor by selecting the target sensor from the plurality of sensors based on the expected input.

In example 27C, the subject matter of any one of examples 1C to 26C, can optionally include that the input interface is further configured to receive a driving-related information; and can optionally include that the processor is further configured to select the expected input based on the driving-related information. In example 28C, the subject matter of example 27C, can optionally include that the processor is further configured select the expected input based on the driving-related information by excluding one or more expected inputs from the plurality of expected inputs to obtain a subset of the plurality of expected inputs; and can optionally include that the processor is further configured to select the expected input randomly from the subset of the plurality of expected inputs.

In example 29C, the subject matter of example 27C, can optionally include that the processor is further configured select the expected input based on the driving-related information by adding one or more predefined expected inputs to the plurality of expected inputs to obtain a superset of the plurality of expected inputs; and can optionally include that the processor is further configured to select the expected input randomly from the superset of the plurality of expected inputs. In example 30C, the subject matter of any one of examples 27C to 29C, can optionally include that the expected input includes a first expected input, can optionally include that the processor is further configured to select a second expected input randomly from the predefined plurality of expected inputs based on the driving-related information.

In example 31C, the subject matter of any one of examples 1C to 29C, can optionally include that the processor is further configured to select a second expected input randomly from the predefined plurality of expected inputs based on the received input. In example 32C, the subject matter of example 31C, can optionally include that the processor is further configured to generate the output by generating an audio signal to indicate the expected input, can optionally include that the audio signal includes an audible indication to indicate the expected input.

In example 33C, the subject matter of example 32C, can optionally include that the audible indication includes a first audible indication indicating the first expected input, and a second audible indication indicating the second expected input. In example 34C, the subject matter of any one of examples 1C to 33C, can optionally include that the processor is further configured to generate a driver alertness score based on the received input. In example 35C, the subject matter of example 34C, can optionally include that the processor is further configured to generate a driver alertness score based on the determination result. In example 36C, the subject matter of any one of examples 27C to 35C, can optionally include that the driving-related information includes at least one of the following: a distraction information indicating estimated distraction of the driver, and/or a location information indicating the location of a vehicle that the driver is driving, and/or a temperature information indicating a temperature, and/or a trajectory information indicating a trajectory of the vehicle, and/or a position information indicating a position for the driver, and/or a hand position information indicating a position for a hand of the driver, and/or a traffic information indicating a traffic status for the vehicle.

In example 37C, the subject matter of any one of examples 1C to 36C, can optionally include that the processor is further configured to select a first expected input randomly from the plurality of expected inputs, and select a second expected input based on the first expected input. In example 38C, the subject matter of example 37C, can optionally include that the second expected input includes a dynamic interaction based on the first expected input. In example 39C, the subject matter of example 38C, can optionally include that the dynamic interaction includes a movement based on the first expected input.

In example 40C, the subject matter includes a vehicle may include a device for estimating an alertness level for a driver may include: a processor configured to: select an expected input randomly from a predefined plurality of expected inputs, generate an output indicating the expected input, provide the output to an output interface, determine a determination result whether an input received from an input interface in response to the output relates to the expected input a driving wheel may include a plurality of excitation elements configured to receive an excitation signal from the output interface based on the output; one or more sensors that are configured to provide information indicating a detection of a hand of the driver. In example 41C, the vehicle further may include an advanced driver-assistance system (ADAS) configured to provide a driving-related information to the input interface.

In example 42C, the subject matter includes a non-transitory computer-readable medium including instructions when executed on a processor, cause the processor to perform according to any one of examples 1C to 41C.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising:
   a processor; and
   an interface coupled to the processor, wherein the interface is configured to communicatively couple the processor to one or more input devices via an electrical or a radio connection;
   wherein the processor is configured to:
   receive, via the interface, first sensor data comprising information indicating a detection comprising a facial attribute of an occupant for a vehicle, second sensor data comprising information indicating a detection comprising a body attribute of the occupant for a period of time, and movement information representing kinematic forces that the vehicle experiences;
   determine an identity for the occupant based on the first sensor data;

estimate a behavior for the occupant based on the second sensor data, wherein the behavior is estimated based on a detected action of the occupant;

determine a spoofing attempt result indicating whether the occupant attempts a spoofing based on the determined identity and the estimated behavior, wherein the spoofing attempt result is determined to represent that the occupant attempts the spoofing if the detected action does not correspond to the information indicating the kinematic forces that the vehicle experiences.

2. The device of claim 1, wherein the first sensor data comprises a first modality information indicating the detection of the facial attribute of the occupant based on a first modality and a second modality information indicating the detection of the facial attribute of the occupant based on a second modality, wherein the first modality information comprises a near-infrared (NIR) image of the occupant, and the second modality information comprises a depth image of the occupant, wherein the processor is further configured to determine the spoofing attempt result based on the first modality information and the second modality information.

3. The device of claim 2, wherein the processor is further configured to:

generate a first spoofing attempt score based on the first modality information;

generate a second spoofing attempt score based on the second modality information;

combine the first spoofing attempt score and the second spoofing attempt score to determine the spoofing attempt result.

4. The device of claim 1, wherein the processor is further configured to:

determine the identity for the occupant based on the first sensor data according to an occupant information comprising one or more occupant facial attributes.

5. The device of claim 1, wherein the second sensor data comprises information indicating the detection of the body attribute of the occupant for a period of time, and wherein the processor is further configured to:

detect an action of the occupant spatiotemporally to obtain the detected action; and estimate the behavior of the occupant based on the detected action of the occupant.

6. The device of claim 5, wherein the processor is further configured to:

compare the detected action of the occupant and a predefined spoofing action; and determine the spoofing attempt result based on the comparison of the detected action with the predefined spoofing action.

7. The device of claim 5, wherein the detected action comprises a first action based on the second sensor data comprising information indicating the detection of the occupant for a first period of time, wherein the processor is configured to:

detect a second action based on the second sensor data comprising information indicating a detection of the occupant for a second period of time;

determine the spoofing attempt result based on the first action and the second action;

compare the first action with the second action to obtain a difference score to determine the spoofing attempt result.

8. The device of claim 5, wherein the processor is further configured to determine the spoofing attempt result based on the movement information indicating the movement of the vehicle on at least one time instance and the detected action.

9. The device of claim 1, wherein the processor is further configured to:

determine the spoofing attempt result based on a third sensor data comprising information indicating detection of an attribute of a further occupant located in the vehicle;

detect a further occupant action for the further occupant based on the third sensor data; and determine the spoofing attempt result based on the detected further occupant action.

10. The device of claim 4, wherein the second sensor data comprises at least one image of at least a portion of the body of the occupant, wherein the occupant information comprises information indicating a predefined behavior for the occupant, wherein the processor is further configured to:

estimate a second identity by comparing the estimated behavior of the occupant and the occupant information;

determine a matching result indicating whether the first identity matches the second identity;

determine the spoofing attempt result based on the matching result.

11. The device of claim 1, wherein the second sensor data comprising information indicating a detection of a second modality, the second modality comprises an interaction of the occupant with the vehicle using a hand.

12. The device of claim 10, wherein the determined identity comprises a first identity, wherein the occupant information comprises information indicating a predefined behavior for the occupant, and wherein the processor is further configured to:

determine a second identity for the occupant based on the estimated behavior for the occupant according to the occupant information;

determine the second identity by comparing the estimated behavior of the occupant and the occupant information comprising a plurality of behaviors for a plurality of occupants.

13. A non-transitory computer-readable medium including one or more instructions that when executed on a processor communicatively coupled through an interface to one or more input devices via an electrical or a radio connection, cause the processor to:

receive, via the interface, first sensor data comprising information indicating a detection comprising a facial attribute of an occupant for a vehicle, second sensor data comprising information indicating a detection comprising a body attribute of the occupant for a period of time, and movement information representing kinematic forces that the vehicle experiences;

determine an identity for the occupant of the vehicle based on the first sensor data;

estimate a behavior for the occupant based on the second sensor data, wherein the behavior is estimated based on a detected action of the occupant;

determine a spoofing attempt result indicating whether the occupant attempts a spoofing based on the determined identity and the estimated behavior, wherein the spoofing attempt result is determined to represent that the occupant attempts the spoofing if the detected action does not correspond to the information indicating the kinematic forces that the vehicle experiences.

14. The non-transitory computer-readable medium of claim 13, wherein the one or more instructions further cause the processor to:
generate an output, wherein the output comprises at least one of the following:
authentication result indicating a decision to authenticate or not authenticate the occupant based on a matching result;
an adjustment result indicating to adjust a setting of the vehicle based on the at least one setting for an authenticated occupant;
an alertness result indicating a determined alertness score of the occupant based on at least one of the first sensor data and/or the second sensor data;
an encoded message indicating the spoofing attempt result;
a display information to be displayed to the occupant, wherein the display information comprises information indicating an entry for a username and/or password for the occupant; or information indicating a predetermined question for the occupant.

15. The non-transitory computer-readable medium of claim 13,
wherein the first sensor data comprises a first modality information indicating the detection of the facial attribute of the occupant based on a first modality and a second modality information indicating the detection of the facial attribute of the occupant based on a second modality,
wherein the first modality information comprises a near-infrared (NIR) image of the occupant, and the second modality information comprises a depth image of the occupant,
wherein the instructions are further configured to cause the processor to determine the spoofing attempt result based on the first modality information and the second modality information.

16. The non-transitory computer-readable medium of claim 15,
wherein the instructions are further configured to cause the processor to:
generate a first spoofing attempt score based on the first modality information;
generate a second spoofing attempt score based on the second modality information;
combine the first spoofing attempt score and the second spoofing attempt score to determine the spoofing attempt result.

17. The non-transitory computer-readable medium of claim 13,
wherein the instructions are further configured to cause the processor to determine the identity for the occupant based on the first sensor data according to an occupant information comprising one or more occupant facial attributes.

18. The non-transitory computer-readable medium of claim 13,
wherein the second sensor data comprises information indicating the detection of the body attribute of the occupant for a period of time, and
wherein the instructions are further configured to cause the processor to:

detect an action of the occupant spatiotemporally to obtain the detected action; and
estimate the behavior of the occupant based on the detected action of the occupant.

19. The non-transitory computer-readable medium of claim 13,
wherein the instructions are further configured to cause the processor to:
compare the detected action of the occupant and a predefined spoofing action; and
determine the spoofing attempt result based on the comparison of the detected action with the predefined spoofing action.

20. The non-transitory computer-readable medium of claim 13,
wherein the detected action comprises a first action based on the second sensor data comprising information indicating the detection of the occupant for a first period of time,
wherein the instructions are further configured to cause the processor to:
detect a second action based on the second sensor data comprising information indicating a detection of the occupant for a second period of time;
determine the spoofing attempt result based on the first action and the second action;
compare the first action with the second action to obtain a difference score to determine the spoofing attempt result.

21. The non-transitory computer-readable medium of claim 13,
wherein the instructions are further configured to cause the processor to determine the spoofing attempt result based on the movement information indicating the movement of the vehicle on at least one time instance and the detected action.

22. The non-transitory computer-readable medium of claim 13,
wherein the instructions are further configured to cause the processor to:
determine the spoofing attempt result based on a third sensor data comprising information indicating detection of an attribute of a further occupant located in the vehicle;
detect a further occupant action for the further occupant based on the third sensor data; and
determine the spoofing attempt result based on the detected further occupant action.

23. The non-transitory computer-readable medium of claim 17,
wherein the second sensor data comprises at least one image of at least a portion of the body of the occupant,
wherein the occupant information comprises information indicating a predefined behavior for the occupant,
wherein the instructions are further configured to cause the processor to:
estimate a second identity by comparing the estimated behavior of the occupant and the occupant information;
determine a matching result indicating whether the first identity matches the second identity;
determine the spoofing attempt result based on the matching result.

24. The non-transitory computer-readable medium of claim 13, wherein the second sensor data comprising information indicating a detection of a second modality, the second modality comprises an interaction of the occupant with the vehicle using a hand.

25. The non-transitory computer-readable medium of claim 23,
wherein the determined identity comprises a first identity,
wherein the occupant information comprises information indicating a predefined behavior for the occupant, and
wherein the instructions are further configured to cause the processor to:
determine a second identity for the occupant based on the estimated behavior for the occupant according to the occupant information;
determine the second identity by comparing the estimated behavior of the occupant and the occupant information comprising a plurality of behaviors for a plurality of occupants.

\* \* \* \* \*